United States Patent
Vaman et al.

[11] Patent Number: 5,956,372
[45] Date of Patent: Sep. 21, 1999

[54] CODING SYSTEM FOR DIGITAL TRANSMISSION COMPRESSION

[75] Inventors: Dhadesugoor R. Vaman, Frederick; Richard B. Marsten, Kensington, both of Md.; Elliot L. Gruenberg, West New York; Xiaomei Qian, Hoboken, both of N.J.

[73] Assignee: Digital Compression Technology, L.P., New York, N.Y.

[21] Appl. No.: 08/748,553

[22] Filed: Nov. 8, 1996

Related U.S. Application Data

[63] Continuation-in-part of application No. 08/668,594, Jun. 19, 1996, abandoned, which is a continuation of application No. 08/418,254, Apr. 6, 1995, abandoned, which is a continuation of application No. 08/210,141, Mar. 17, 1994, abandoned.

[51] Int. Cl.$^6$ ..................................................... H04L 27/28
[52] U.S. Cl. .......................................... 375/260; 375/346
[58] Field of Search ..................................... 375/260, 261, 375/295, 316, 340, 377, 240, 346, 259; 329/103; 332/304; 395/2.91, 2.92

[56] References Cited

U.S. PATENT DOCUMENTS

| 4,601,046 | 7/1986 | Halpern et al. | 375/38 |
| 5,162,812 | 11/1992 | Aman et al. | 375/39 |

Primary Examiner—Tesfaldet Bocure
Attorney, Agent, or Firm—Lieberman & Nowak, LLP

[57] ABSTRACT

An improved coding system for digital transmission compression applicable as a digital compression algorithm for increasing the bandwidth of telecommunications and broadcasting networks. The improved coding system operates in the transmission regime, not in baseband (source) so that a transmission channel having a capacity of 1 Mbit/s can deliver N Mbit/s, where N bits in parallel are combined to be delivered in the 1 Mbit/s channel. The system includes the steps of simultaneously encoding a first group of parallel binary bits into a digitized voltage amplitude signal in a predetermined bit interval, modulating a carrier with the digitized voltage amplitude signal, transmitting the modulated carrier over a bandwidth limited communications highway having intrinsic noise therein, demodulating said modulated carrier signal and receiving said digitized voltage amplitude signal, said demodulating means substantially cancelling said intrinsic noise and improving said output signal to noise ratio; and decoding the digitized voltage amplitude signal received in the predetermined bit interval into a second group of parallel binary bits which correspond to the first group of parallel binary bits. The digital compression algorithm is applicable to telephone networks, including telephone twisted pair (TTP) wiring, coaxial cables for telephony, data transmission, and video transmission with or without accompanying sound; microwave, cellular, mobile, and personal communications networks; radio and satellite networks and can be realized physically in very-large-scale-integrated (VLSI) chips.

20 Claims, 14 Drawing Sheets

CODING SYSTEM FOR DIGITAL TRANSMISSION COMPRESSION

RELATED APPLICATIONS

This application is a continuation-in-part of pending U.S. patent application Ser. No. 08/668,594 filed Jun. 19, 1996, which is a continuation of U.S. patent application Ser. No. 08/418,254 filed Apr. 6, 1995, now abandoned, which is a continuation of U.S. patent application Ser. No. 08/210,141, now abandoned.

FIELD OF THE INVENTION

The present invention relates to apparatus and method for increasing transmission capacity of an existing telecommunications infrastructure, which includes Telephone Twisted Pair (TTP), Coaxial Television (CATV) cable, microwave, mobile and personal communications networks, radio and satellite communications networks.

DESCRIPTION OF PRIOR ART

The invention relates to the feedback concept described in U.S. Pat. No. 5,029,210, "Cooperative Communications System", issued in July 1991 to Elliot L. Gruenberg, the teachings of which are incorporated herein by reference. This invention also relates to U.S. patent application, Ser. No. 07/812,417, entitled "Scanless TV," filed by Elliot L. Gruenberg on Dec. 23, 1991, and modified by continuation-in-part application, entitled "Compressive Communications and Storage System", filed on Nov. 11, 1993. The teachings of the foregoing are also incorporated herein by reference.

The technologies in compression of digital signals can be classified into two categories:

Source compression

Transmission compression

Source compression is based on removing redundant information from the source and thus enabling transmission to be achieved at a lower rate. However, removal of redundant information requires understanding of the correlative properties of the signals. These properties are unique to each type of signal, such as voice or video signals. The redundant information needs to be estimated at the receiver to reproduce the source information. Thus, source compression techniques are unique to each type of signal that is transmitted.

Transmission compression increases the capacity of transmission on a bandlimited channel. A specific technology that has been implemented includes Asynchronous Digital Subscriber Loop (ADSL).

The ADSL technology makes use of Quadrature Amplitude Modulation (QAM) for modulating carriers by the input data. This technology has been implemented in two versions. Version 1 is based on AT&T's Combined Amplitude and Phase (CAP) modulation. This version delivers 1.544 Mbit/s on an existing telephone twisted pair (TTP) subscriber loop. It is useful for one-way delivery of one compressed Motion Picture Experts Group (MPEG)-encoded taped video on each TTP. Version 2 is based on the technology jointly developed by Northern Telecommunications Corporation and Amati Corporation. The concept is based on Discrete Multi-tone Transmission (DMT). For TTP applications, the DMT develops 250 subbands, with each subband having a 4 kHz bandwidth, from a total bandwidth of 1 MHz. Each subband uses QAM as the modulation scheme. It permits a total of 6 Mbit/s one way transmission and a total of 528 kbit/s bidirectional transmission. The 528 kbit/s includes a 384 kbit/s channel and a 144 kbit/s Integrated Services Digital Network (ISDN) basic rate access channel. Thus, a total of 7 Mbit/s is transmitted on the channel.

The DMT algorithm has been proposed to Accreditation Standards Committee (ASC) T1 for standardization. The algorithm is being considered for 24 gauge wire by ASC T1.

SUMMARY OF THE INVENTION

The invention described in this patent application is a digital compression technology for increasing the bandwidth of telecommunications and broadcasting networks. The invention is applicable to telephone networks, including telephone twisted-pair wiring but not limited to it; coaxial cables for telephony, data transmission and video transmission with or without accompanying sound; microwave, cellular, mobile and personal communications networks; radio and satellite systems. The invention applies to multimedia applications in all of the above components of telecommunications and broadcast networks. It operates in the transmission regime, not in baseband (source regime).

The inventive coding system is based on a novel method of combining a set of parallel digital signals for transmission at frequencies used by the aforementioned telecommunications and broadcast networks. This system uses a combined coding and modulation method for achieving the compression. The system facilitates sending many parallel data bits in a single symbol period. For example, if the channel can deliver 1 Mbit/s, using the inventive coding system the same channel can deliver N Mbit/s, where N bits in parallel are combined to be delivered in a 1 Mbit/s channel.

An object of the invention is to increase transmission capacity of a bandlimited channel to facilitate multimedia service provisioning. The instant invention will facilitate telephone companies' providing multimedia services instantly to residential homes over existing TTP, facilitate CATV operators' providing new and evolving interactive services without resorting to fiber optic cabling to homes, and enable broadcasters to greatly increase the number of channels on the existing radio and satellite networks.

These and other objects and features of the invention will be more fully appreciated from the following detailed description when taken in conjunction with the accompanying drawings, in which:

BRIEF DESCRIPTIONS OF THE DRAWINGS

FIG. 1 is an overview of a compressed transmission system showing DV compression, coding and decoding, FIG. 2 is a schematic diagram of the DV coder for compressed transmission, FIG. 3 is a schematic diagram of the DV decoder for regenerating the uncompressed digital data, FIG. 4 is a schematic diagram of the DV decoding tree, FIG. 4a is a diagram of the Tree generator 301-I, FIG. 5 is a schematic diagram illustrating the full duplex transmission system in accordance with the instant invention, FIG. 6 is a diagram showing details of the inventive full duplex compression system, FIG. 7 is a diagram of a spike filter used with the instant invention, FIG. 7A is a circuit diagram of the timed peak detector of the instant invention;

DETAILED DESCRIPTION OF THE INVENTION

Figure 1:
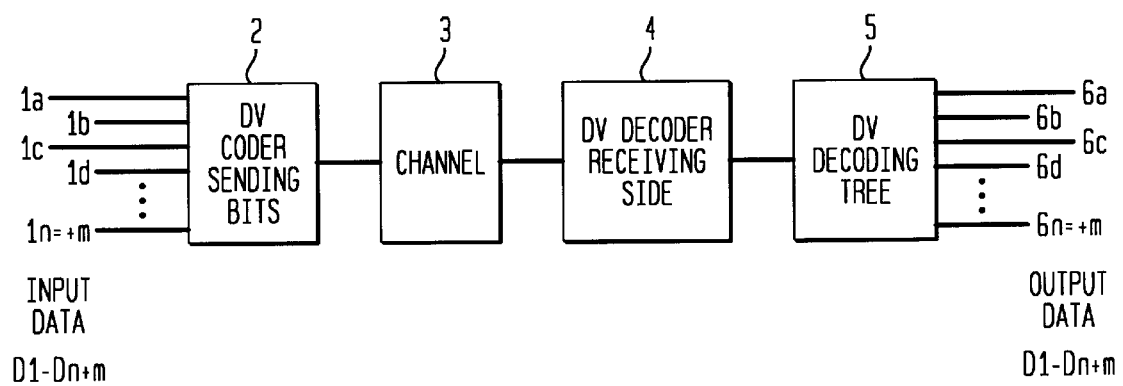

The inventive technology embodies a DV Coding System for increasing the channel capacity of an existing infrastructure. The DV Coding System has been tested for 26 gauge TTP subscriber loop, where it supports 16 Mbit/s transmission over a single TTP for a loop distance of over 12000 ft. Thus, it can operate on more than 85% of existing subscriber loops to residential homes. The instant invention, for subscriber applications, provides 16:1 compression for one way transmission in a TTP bandlimited channel of 1 MHz. Higher compression rates are possible. The system can also be used in a full duplex mode. Using a single TTP, the system enables 16 Mbit/s full duplex operation when combined with suitable filters. If two TTPs are used, the system facilitates delivery of 32 Mbit/s full duplex information, which is more than adequate to deliver many television channels to homes and offices. It should be noted that most homes are commonly wired with two TTPs.

The DV coding system is very simple and can easily be implemented in hardware using very-large-scale-integrated (VLSI) circuits. It has significant advantages:

It facilitates use of the installed TTP to homes and businesses with no rewiring required for high-capacity, multimedia applications.

The system has no limitation on the specificity of the channel. It can be used for TTP subscriber loops, CATV cables, wireless channels, radio, and satellite channels. The compression ratios of the system with respect to increasing the channel capacity vary as a function of the type of channel used, nature of distortion in the channel, and additive noise.

The DV coding system uses transmission compression instead of source compression. Thus, it is applicable to any source media.

The DV coding algorithm facilitates provision of many services over a single channel. An example of using an existing TTP involves simultaneous provision of the following services to residences and businesses:

Multiple telephones

Multiple video (VCR quality) channels

Data services for computer applications

Facsimile services

Information services such as Data-Base services

Full-motion live TV, and

HDTV channel as and when available.

Table 1 illustrates a comparative analysis of the DV Coding Algorighm with other transmission compression techniques.

TABLE 1

Comparison of DV Coding System with Other Coding Techniques

| Item | ISDN | HDSL | ADSL | DV System |
|---|---|---|---|---|
| Capacity on Existing Loop | 144 Kbit/s | 1.544 Mbit/s | 6 Mbit/s Asynchronous + 528 Kbit/s Full Duplex (7 Mbit/s total) | 16 Mbit/s each direction Full Duplex per TTP (32 Mbit/s) |
| Reach | Over 12000 ft | Over 12000 ft | Unknown | Over 12000 ft |
| TTP Type | Gauge 26 | Gauge 26 | Gauge 24 | Gauge 26 |
| Transmission medium | TTP, Satellite | TTP | TTP | TTP, CATV, Cellular, Microwave, Mobile, PC's, Radio, and Satellite |
| Transmission Compression | No | No | Yes - Modulation | Yes - Modulation |
| Cross Talk Immunity | Yes-NEXT, FEXT | Yes-NEXT, FEXT | Yes- NEXT, FEXT | Yes- NEXT, FEXT |
| Bit Error Rate | $<10^{-7}$ | $<10^{-7}$ | $<10^{-7}$ | $<10^{-7}$ |

More particularly, the DV Coding System is based on transmission compression and does not use any redundancies of the source. The method developed is independent of the source type. Thus, digital information can be applied to it as the source, whether pre-coded or not. The purpose of the DV Coding System is to increase the transmission capacity of an existing bandlimited channel.

It should be noticed that increased transmission capacity of say, 16: 1, enabling transmission of 16 bits in a single symbol period, reduces transmission time, while simultaneously increasing the capacity of the transmission medium. That is to say that the transmission of a particular message program, video tape, data, fax or voice, can now occur in 1/16th of the time required without the invention. If the invention is applied by paralleling N bits at the input to the DV decoder, transmission time will be reduced by N: 1, while transmission capacity is increased by that same factor.

Further, using commercially available first-in/first-out (FIFO) VLSI products, it is possible to store DV-coded messages for delayed transmission, since nothing in the invention requires immediate, undelayed transmission from paralled input to the DV-decoded output. Because of the N:1 transmission "compression" obtained with the DV-coding technique, storage capacity required for any message is reduced by the same factor of N. Thus, the 16:1 increased transmission capacity of the current simulation of the invention permits 16:1 reduction in memory required to store messages for delayed transmission.

Both the features described above have significant and economic implications for end users in reduced transmission and storage costs.

Figure 3:
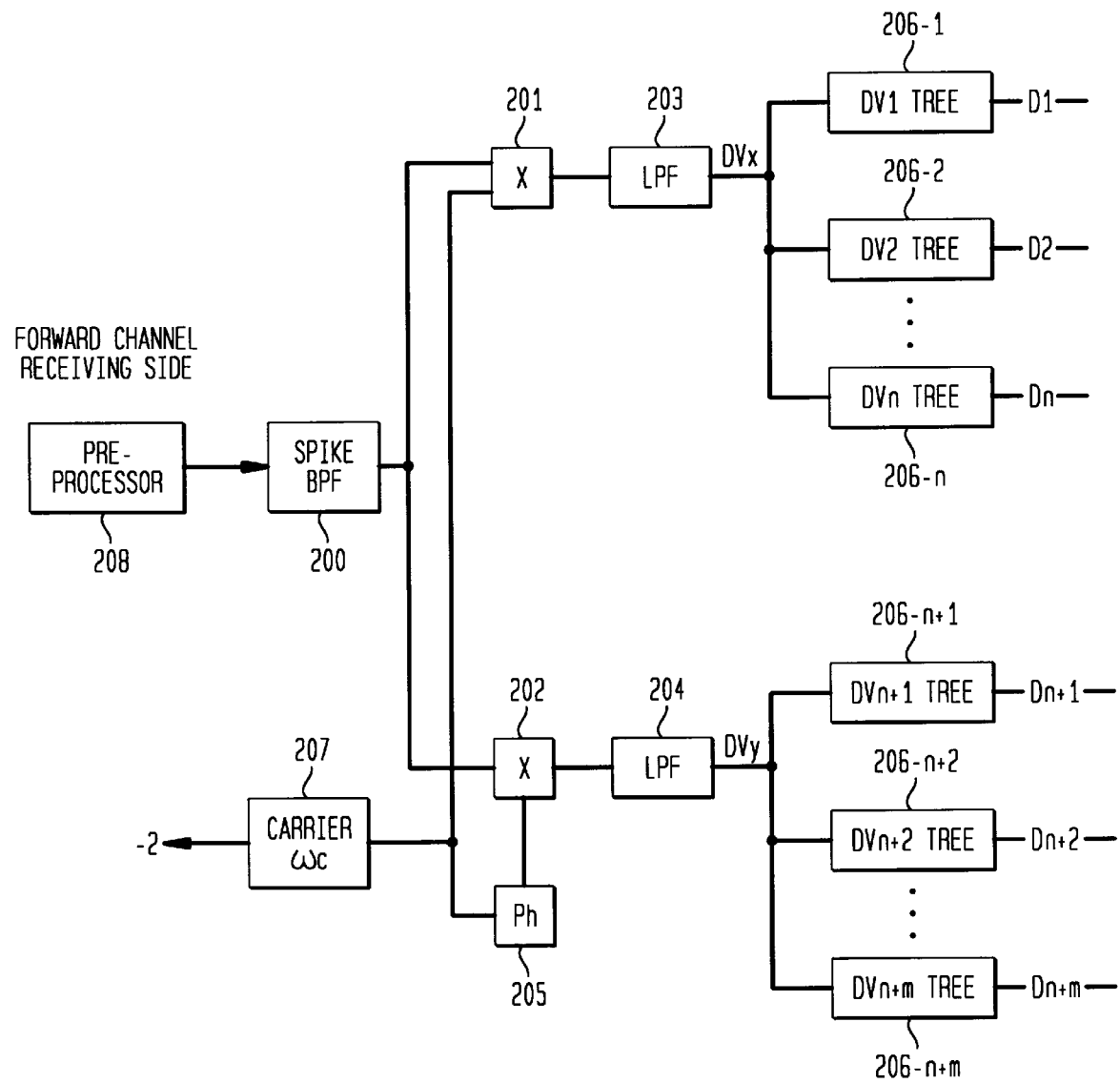
Figure 4:
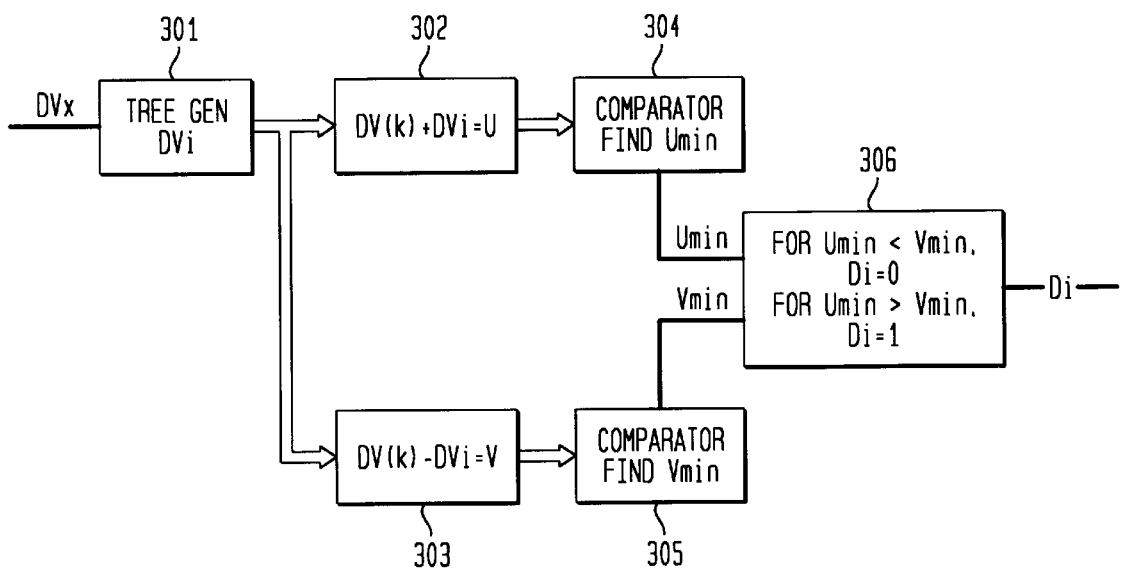

The DV coding tree facilitates sending many data bits in a single symbol period, thus achieving increased transmission capacity. Assume that a channel of bandwidth BW can transmit data at a rate R bit/s without the use of DV coding system. Using the DV coding algorithm, the same channel will be able to transmit N*R bit/s for a compression ratio of N:1 within the same bandwidth BW. N is the number of bits placed in parallel for each symbol. The overall system as part of this invention includes the following set of apparatus:

Overall System Apparatus (FIG. 1)
   DV Coder for the sending side (FIG. 2)
   DV Coder for the receiving side (FIG. 3)
   DV Decoding Tree to extract parallel data bits (FIG. 4)

Referring to FIG. 1, the sending side DV coder 2 takes D1–Dm data bits 1 in parallel and generates a modulated carrier, which is transmitted over the channel 3. The receiving side DV coder 4 extracts a voltage value from the received modulated carrier in every symbol period. That voltage will be used by the DV decoding tree apparatus 5 to extract D1–Dm parallel bits.

Figure 2:
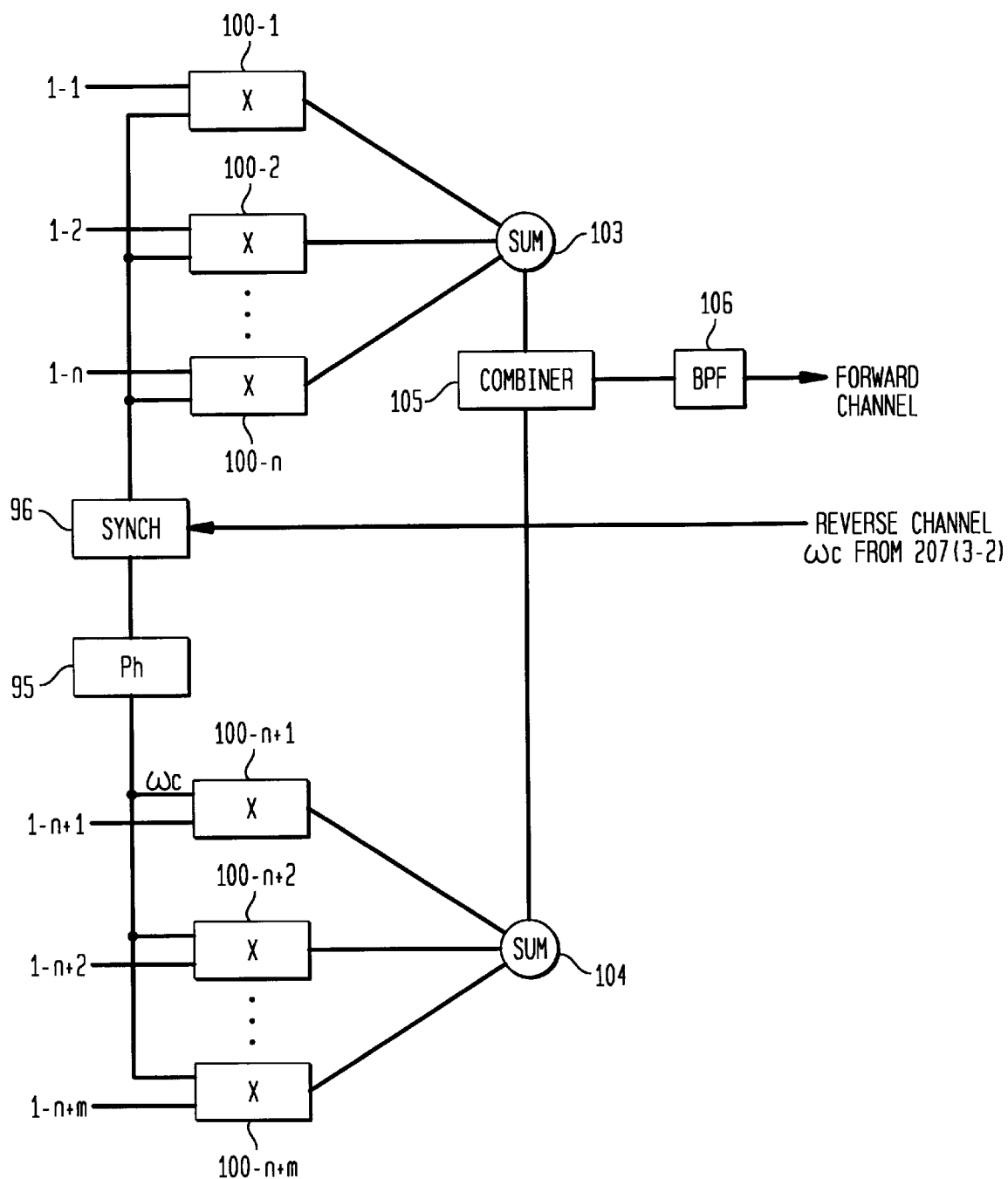

The apparatus that corresponds to the DV coder for the sending side 2 is illustrated in FIG. 2. This apparatus facilitates collection of D1–Dm parallel data bits and generates a modulated carrier using a combined coding and modulation method. The modulation amplitude for each parallel group of coded bits constitutes a symbol.

At the sending side, the data bits for transmission are organized into two groups:

Group 1, 1-1 . . . 1-n, consists of D1, D2, . . . , Dn and
   Group 2, 1-n+1 . . . 1-n+m, consists of Dn+1, Dn+2, . . . , Dn+m.
   For 16:1 compression, n=8 and m=8, and each group delivers 8 bits in parallel in one symbol period.

Each data bit, Di, produces a voltage value DVi. When Di is '1', DVi is positive and when Di is '0', DVi is negative. The amplifier/multipliers 100-1 . . . 100-n;100-n=1 . . . 100-n+m produce outputs of $Di*Sin\omega_c t$ in the first group and $DVi*Cos\omega_c t$ in the second group.

The carrier $\omega_c$ is generated by carrier oscillator 207 located in the receiver 4 (See FIG. 3). This signal is fed back to the transmitter 2 via channel 3. It is important that the sender carrier $\omega_c$ is in corresponding phase with the phase of the demodulating carrier, which is used by the receiver for the duration of each symbol period (during which a group of bits is sent in parallel) so as to insure proper detection of the symbol's amplitude. Phase coherence does not ordinarily exist from one symbol period to another, so that the symbol's phase must be continually adjusted.

The output of the SUM 103 of the first group is:

$$\text{Output(group1)} = [DV1+DV2+ \ldots +DVn]*\text{Sin } \omega_c t$$

The Output of the SUM 104 of the second group is:

$$\text{Output(group2)} = [DVn+1+DVn+2+ \ldots +DVn+m]*\text{Cos } \omega_c t$$

Combiner 105 adds SUM 103 and SUM 104 linearly for transmission. Each composite transmitted signal is given by $$\sum_{i=1}^{n} DVi*\text{Sin}\omega_c t + \sum_{j=n+1}^{n+m} DVj*\text{Cos}\omega_c t$$

The composite transmitted signal is passed through Band Pass Filter (BPF) 106 to DV decoder 4.

The apparatus 4 that constitutes the DV decoder in the receiving side of the system is illustrated in FIG. 3.

The combined signal on the forward channel from the sending side 2 is passed through a pre-processor 208, a very narrow bandpass filter (BPF) 200—the "spike" filter, to be discussed later—to remove the out-of-band noise (crosstalk and channel noise). The output of the BPF is used to recover DVX and DVY (see FIG. 3) as follows:

The output signal after the BPF (spike filter) 200 is multiplied by $\text{Sin}\omega_c t$ in 201 to generate SIGNAL 1 for the recovery of the first group of data bits and is multiplied by $\text{Sin}(\omega_c t+PH)$ in 202 to generate SIGNAL 2 for the recovery of the second group of data bits.

The voltage values DVX and DVY (FIG. 3) are recovered by passing SIGNAL 1 and SIGNAL 2 through low pass filters (LPF) 203 and 204 respectively. Thus, DVX and DVY are derived as follows:

$$DVX = LPF\{[\text{Output of } BPF]*\text{Sin } \omega_c t\}$$

$$DVY = LPF\{[\text{output of } BPF]*\text{Sin } (\omega_c t+PH)\}$$

To ensure unambiguous detection of the DVi groups, the modulation of SIGNAL 1 and SIGNAL 2 must be maintained 90° out of phase, This property, orthogonality, is well known. To maintain orthogonality, the phase shift PH 205 is 90 degrees.

Referring now to FIG. 4, DVX is used as the input signal to the DVi trees 206-1 . . . 206-n to recover data {D1, D2, . . . , Dn} and DVY is used as the input signal to the DVj trees 206-n+1 . . . 206-n+m to recover data {Dn+1, Dn+2, . . . , Dn+m}. Since the data recovery process is identical for the components of DVX and DVY, the subsequent explanation will use DVX and the "DVi" trees only.

The DV decoding tree complex consists of DV1–DVn decoding trees 206-1 . . . 206-n for D1–Dn data bits and DVn+1 . . . DVn+m decoding trees 206-n+1 . . . 206n+m for Dn+1 . . . Dn+m data bits. The apparatus corresponding to the DVi Tree Decoder for recovery of data bit Di is illustrated in FIG. 4.

Figure 4A:
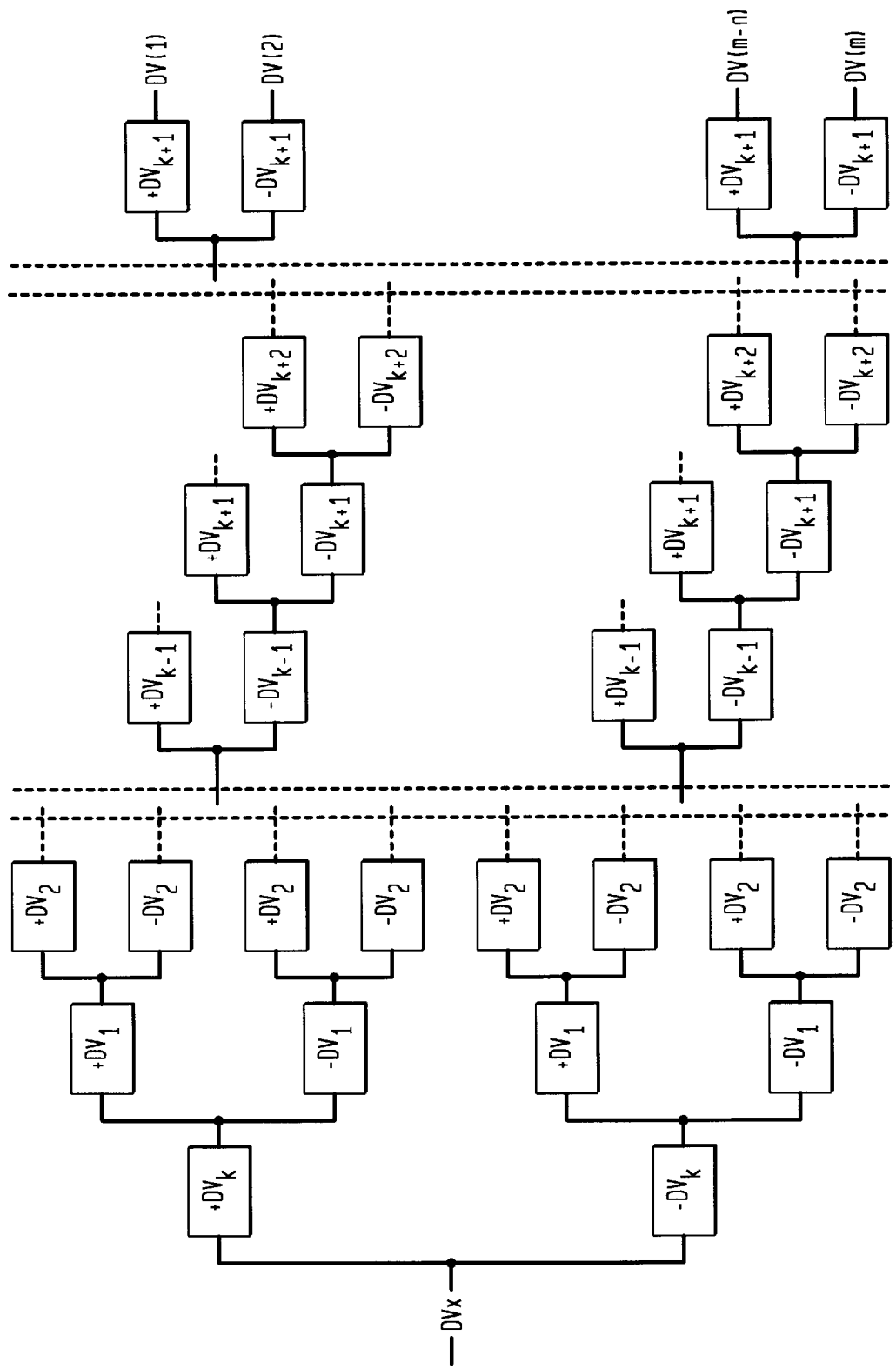

The DVX signal is applied to the input to the tree generator 301-i which is a component of coding tree 206-i. This unit forms a tree of DVX with previously calculated values DVi of the components of DVX as shown in FIG. 4a and will be described more fully later. There will be $r=2^n$ outputs of 301 for each DVX (Symbol) input, where n is the number of bits modulating $\sin \omega_c t$, in order to take into account all possible combinations of these inputs.

The DVi Tree Decoder is required to estimate DVi, where i=1, 2, . . . ,n. For each DVi, the recovered data will be Di, where i=1, 2, . . . ,n, as at the input of FIG. 2. The tree receives DVX for group 1 data and an identical tree processes DVY for group 2 data (FIG. 3). The decoder operation is based on the assumption that both the sending side and the receiving side know the values of DVi, and there is a subtree for each value of DVi. The method of selecting known DVi values will be described later. Known values of DVi are designated below as DVk in the decoding tree (shown in FIG. 4a).

The estimating process is based on minimizing differences among comparisons of DVX (and DVY) with known values of DVi (and DVj) in a manner that identifies all the DVk components of the SUM operations shown previously as the outputs of 103 and 104 of the sender, and choosing DVi (and DVj) values that correspond to the minimum differences. The process proceeds as follows:

For DVi recovery, the tree is segmented to add or subtract DVk (k not equal to i) and generate DV(r) where r=1, 2, . . . , h, as shown in FIG. 4a.

Step 1: Create two branches:
    Branch 1 output=DVX+DVk
    Branch 2 output=DVX−DVk
  Step 2: Create two more branches for each branch 1 and branch 2 by addition of DVk+1 and subtraction of DVk+1.
  Repeat steps until all values of DVk (k not equal to i) are used. The resulting output has r branches with values DV(1), DV(2), . . . , DV(r), where $r=2^n$, as mentioned above.

The decision strategy to recover data bit Di is based on computing the values U and V as follows:

U=[DV(h)+DVi] for each DV(h) in add and store unit 302 (FIG. 4)

V=[DV(h)−DVi] for each DV(h) in subtract and store unit 303

Then minimum U, Umin, is found by comparing the outputs of 302 in comparator 304.

Minimum V, Vmin, is found by comparing outputs of 303 in comparator 305. Then $$Di = 0 \text{ for } Umin < Vmin$$
$$= 1 \text{ for } Umin \geq Vmin$$

as determined in comparator 306.

The same process is repeated for all of the subtrees to recover D1, D2, . . . , Dn+m.

The selection of DVi values is based on the transmission power requirements. For example, telephone channels are required to be operated such that the signal power injected at the input is approximately 10 dBm and the line is terminated using 100 ohms. This specification results in the maximum voltage range. Assume that the voltage range is from VL to VH, where VL is the minimum voltage and VH is the maximum voltage in the range. For the DVi tree decoder to operate, the following selection criteria must be observed to guarantee a unique value of DVi for each data bit Di, such that DVX and DVY can be decoded to derive Di: Assume that Each data bit Di has a path i;

The channel is carrying a combined signal of all paths i and thus, it can be viewed as a logical set of parallel paths for data bit Di; and For data bit Di {0, 1}, the corresponding voltage values are {−DVi, +DVi}. Selection criteria for DVi:

The selection of DVi for path i between VL and VH is given by:

$$DVi = \{[VH-VL]/(n+1)\} + \text{offset } (i)$$

where n is the number of data bits (D1, D2, . . . , Dn) in a group being transmitted and offset (i) is a small shift of level from uniformity for the DVi, chosen to eliminate selection ambiguities introduced by uniformly spacing the levels. Between VH and VL, there are voltage levels DV(1), DV(2), . . . , DV(n) for data bits D1, D2, . . . , Dn. In the above equation, the voltage range (VH−VL) is divided equally into n−1 values for n−1 data paths. The offset (i) is unique to each data path.

Two important constraints must be set for the selection of DVi:

Minimum DVi offset (i)

The minimum DVi value must be selected based on the constraint:

$$VL \leq \min DVi \leq \frac{1}{2}[\{VH-VL\}/(n-1)]$$

To minimize the effect of noise on the channel, min DVi must be far away from the lower bound; and to ensure unique and distinguishable DVi at the receiver for detecting Di, min DVi must be far away from the upper bound VH. The offset (i) must be chosen such that:

addition of any [DVi+DVj] is not equal to DVk and DVi+1−DVi is monotonically increasing.

This will assure generation of unique and distinguishable DVi for detection of Di. The sum of the offset (i) for all DVi is chosen by $$\text{SUM\_offset} = VH - \text{Max } DVi$$

For (n−1) DVi, the total number of offsets is given by:

$$\text{Total\_offset} = \sum_{r=1}^{n-1} r_i$$

where $r_i$ is the Data Voltage index in the set $\{DV_r\}$, and DV1 does not have an offset.

EXAMPLES

For the 8:1 DV coding algorithm there are two groups of four bits each, n=4 for each group of data bits (DV1, DV2, DV3, D4), and the Total offset=6.

For the 16:1 DV coding algorithm there are two groups of eight bits each, n=8 for each group of data bits (DV1, . . . , DV8) and the Total offset=28.

The minimum offset is given by:

offset$_{min}$=SUM_offset/Total offset, and offset (i) for DVi is given by:

offset (i)=(i−1)*offset$_{min}$ for i=1, 2, . . . , n.

Orthogonal Transmission

Orthogonal transmission of DVi groups will double compression. FIG. 2 illustrated the transmission of two groups of data, D1 D2, . . . , Dn; Dn+1, Dn+2, . . . , Dn+m. For orthogonal transmission, the combined signal is generated as follows:

$$\text{combined signal} = \text{sum1} * \text{Sin } \omega_c t + \text{sum2} * \text{Cos } \omega_c t$$

The first term is defined as the Q component; the second term, the I component.

At the receiver, the combined signal is separated into two branches. The first branch generates DVX as follows (FIG. 2):

Q component=[combined signal]* Sin$\omega_c$t and

DVX=LPF output of [Q component].

The second branch generates DVY as follows:

I component=[combined signal]* Cos $\omega_c$t and

DVY=LPF output of [I component]

DVX and DVY are passed through the DVi tree decoder to recover data.

Full Duplex Operation

Figure 5:
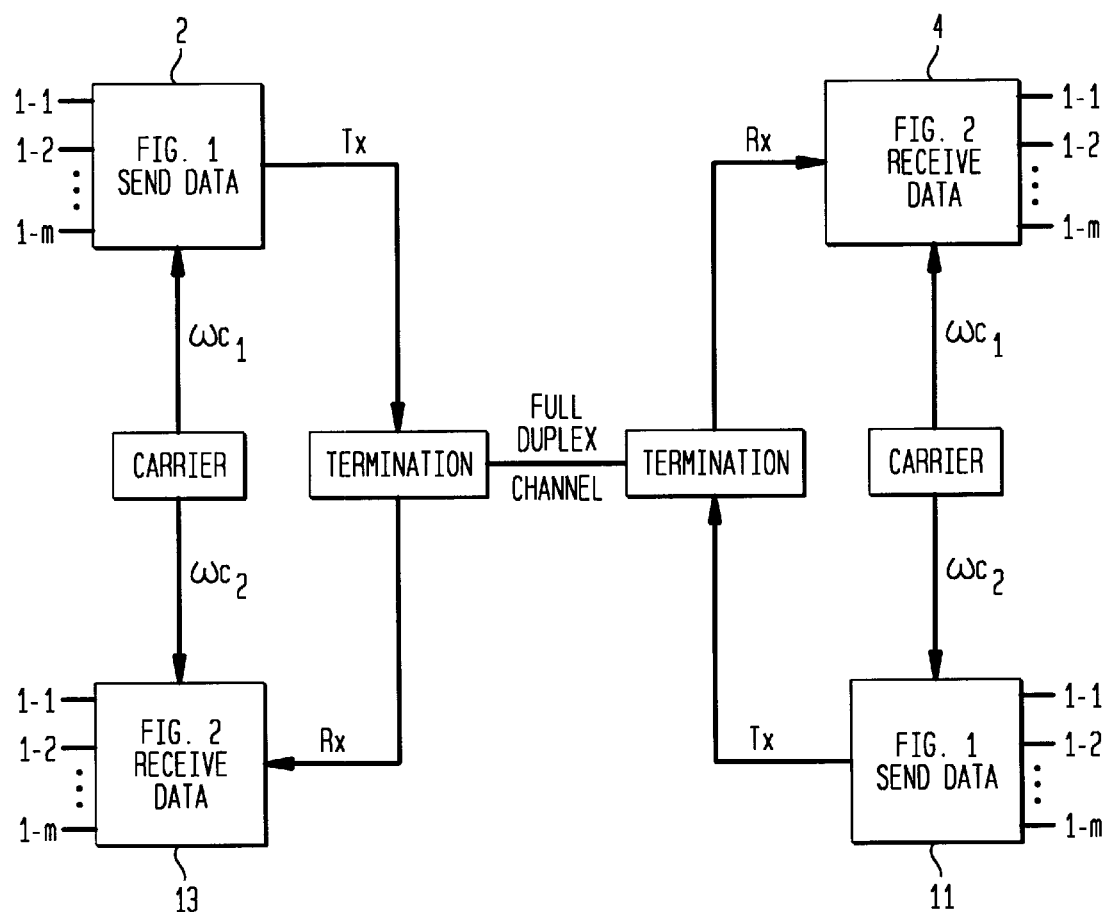

The apparatus that describes a system which facilitates full duplex operation using the DV coding algorithm is illustrated in FIG. 5. The channel is used to receive as well as send the signals. This is typical of a telephone line. For other types of communications systems, the transmit and receive channels are logically separated and therefore the extraction of the signals is very easy. The exact nature of the transmission and reception on a telephone channel is based on specific implementations.

Implementation 1

In this implementation, both sides are sending and receiving simultaneously. Assume that one side is sending combined signal S1 and the other side is sending combined signal S2. S1 and S2 correspondingly are modulated by data bits {D0, D1, . . . , Dm}, which are different at two ends of the system. At any instance of time, the full duplex channel has a total combined signal, which is given by:

Total Channel Signal=$a*S1+b*S2$, where,
  a is the attenuation coefficient for the forward channel,
  b is the attenuation coefficient for the reverse channel, and
  a and b vary as the distance of travel on the channel.
  The signal recovery is achieved as follows:
  S1 is recovered by:

$\{(a*S1+b*S2)-b*S2\}*[1/a]$.

S2 is recovered by:

$\{(a*S1+b*S2)-a*S1\}*[1/b]$.

The timing relationships for recovery of these signals have been well established in telecommunications networks, and thus are not presented here. This implementation is in practice widely in operational telephone systems throughout the United States. However, it should be noted that the propagation delay of the channel that includes processing delay should not exceed a few symbol periods.

Implementation 2

This method uses a well known technique, called "ping-pong." Assume that each TTP is expected to transmit 4.2 Mbit/s of full duplex data. That is, each side is sending at least 4.2 Mbit/s of data. This would result in a transmission of 8.4 Mbit/s of full duplex data using two TTP/s. The ping-pong technique takes advantage of multiple TTPs between two sides to minimize the impact of crosstalk. In the case of two TTPs connecting two stations, the ping-pong technique works as follows:

Side A and Side B are given equal time for transmission on both TTPs.

Side A sends, for a duration of time T, 16 Mbit/s of data on each TTP. That is, both TTPs are transmitting one way. Thus, side A is able to transmit 32 kbit/s for a time duration of T.

In the next time duration of T, only side B is allowed to send 16 Mbit/s of data on each TTP in reverse direction. Thus, the second time duration T is allocated to side B to send 32 Mbit/s of data.

The channel is allocated alternately to side A and side B with equal allocation of time durations T.

This implementation permits the channel to have only one sided transmission in any interval and, therefore, the recovery of data on the remote side is very simple. Also, this method will reduce the crosstalk noise significantly on the channel. However, this method requires buffering of data on both sides, synchronization of transmission from each side, and a protocol to support framing of data. There is a slight overhead that needs to be built for implementation. The trade-off is reduced crosstalk versus the overhead for framing.

The DV coding system works with both of the above implementations.

Full Duplex Symmetric Compressive System

Figure 6:
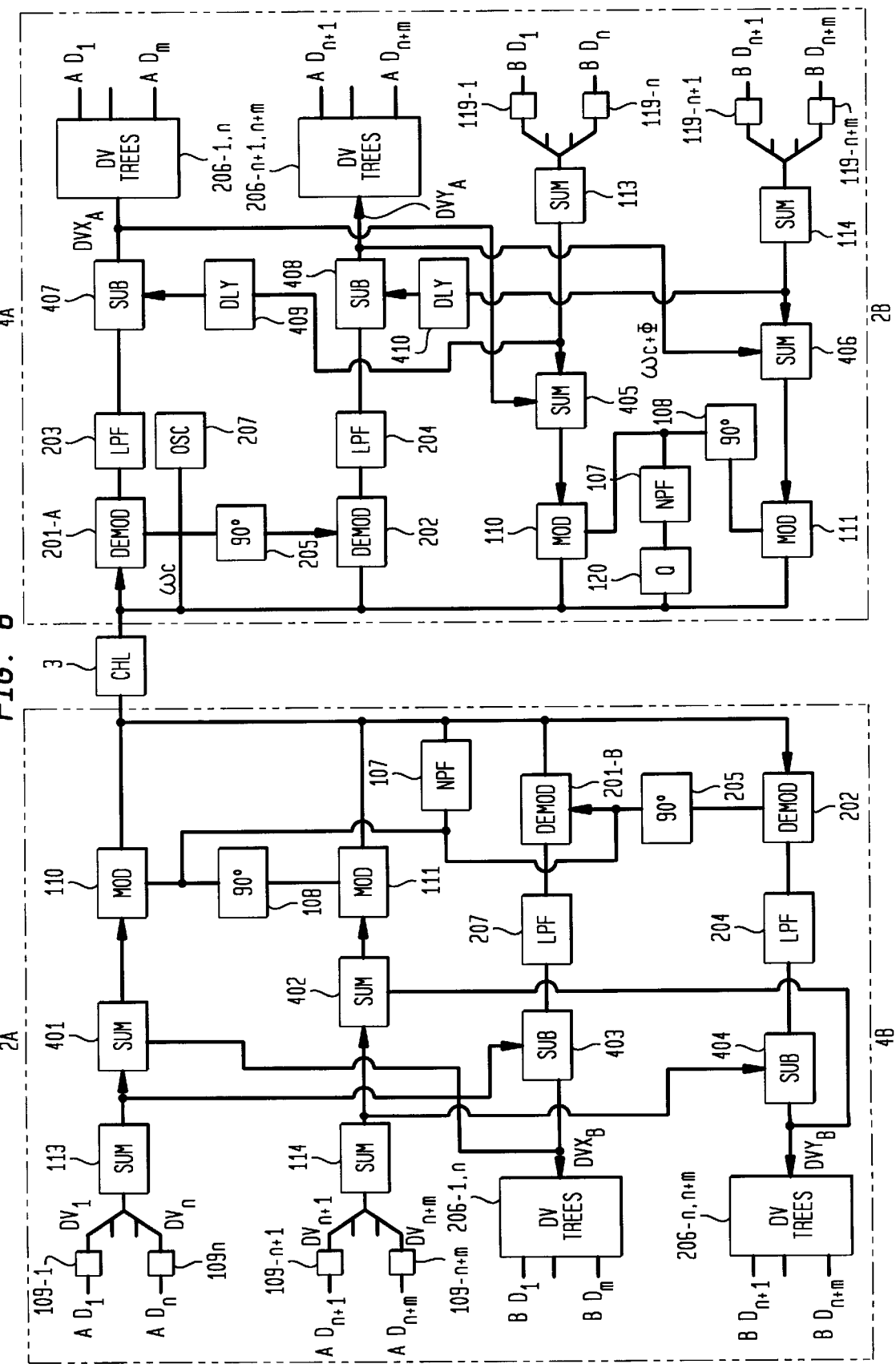

The capability to transmit full 16 Megabits/sec in both directions on a single TTP requires a novel implementation which, in effect, requires doubling the compression ratio since the same bandwidth (channel) is used in both directions. The basic method of doing this in this invention is shown in FIG. 6. It follows some of the principles used in U.S. Pat. No. 5,029,210 previously cited and will work in either implementation, with well-known switching techniques applied in Implementation 2 described above. The terminals have both sender and receiver sides. The left hand terminal comprises sender side 2A and receiver side 4B, while the right hand terminal contains sender 2B and receiver 4A. The information bits entered into sender 2A of the left terminal will be received by receiver 4A of the right terminal while simultaneously the information bits entered into the sender 2B will be received by unit 4B of the left side terminal. Items marked with the same number in these units perform identical functions. For the case n=8, each sender 2A,2B transmits 16 bits simultaneously, using the orthogonal transmission method described above.

In this full duplex system the channel 3 transmits the sum of the outputs of the senders 2A and 2B and each receiver 4A and 4B removes the signal of its respective terminal, leaving the signal containing the information from the other terminal in a manner similar to that given in the previously mentioned U.S. Pat. No. 5,029,210. The method will be described in further detail in what follows. Concentrating on sender 2A, input bits $AD_1$–$AD_n$ are converted to bipolar voltages $DV_1$–$DV_n$ as described above in units 109-1 and 109n, and the voltages are summed in summer 103. The sum signal received by receiver 4B is added to the output of 103 in summer 401. This signal modulates a carrier derived from the right hand terminal. Another group of bits, $AD_{n+1}$–$AD_{n+m}$, are converted to bipolar quantized voltages, $DV_{+1}$–$DV_{n+m}$, in units $109_{n+1}$–$109_{n+m}$ which are summed in 104 and added to the output DVY of the receiver 4B in adder 402. The output of this summer is applied to input of the amplitude modulator 101. The carrier for this modulator is the same carrier signal used in modulator 100 except that it is phase shifted 90° in 108. The outputs of the modulators are added linearly and transmitted on channel 3. In this way the sum of the inputs to sender 2A and the outputs of receiver 4B are sent over channel 3.

In the same manner sender 2B provides an output to the channel from the right hand terminal which is the sum of the inputs to the sender, converted to bipolar signals in the $109_1$–$109_n$ and $109_{n+}$–$109_{n+m}$ units of receiver 2B, with the sum signals DVX and DVY of receiver 4A in Sum units 405 and 406 respectively. This output would be identical to that derived from sender 2A if there were no propagation delays between the terminals. We shall describe below how these delays are compensated for. The receive signals DVX and DVY of receiver 4A are derived from the transmitted composite signals by subtracting the respective orthogonal transmitted signals of 2B in SUB (subtractor) units 407 and 408 respectively. Similar operations are performed in the left hand terminal by SUB (subtractor) units 403 and 404 respectively in sender 4B. Delay units 409 and 410 of 4A are used to ensure that the correct symbols are subtracted from one another, taking into account the propagation delay time between the two terminals.

All carrier signals $\omega_c$ are derived from oscillator 207 located in receiver 4A. The carriers of the left hand terminal are derived from the channel signal and are selected by narrow band filter (NPF) 107 in 2A. The carrier for the right hand terminal sender unit 2B is also derived from the channel and is selected by NPF 107 in 2A but is phase adjusted by phase shift unit 110 in 2B to compensate for propagation delay.

Transmission System with Spike Filter

FIGS. 1–3 illustrate the overall transmission from the sending side to the receiving side. The parallel data bits 1-1 to 1-n are used to produce the specific voltage values for each symbol for various combinations of binary values of data bits 1-1 and 1-n. Similarly, the parallel data bits 1-n+1 to 1-n+m are used to produce specific values similar to those for 1-1 to 1-n bits (FIG. 2). The voltage value derived from bits 1-1 to 1-n is used to modulate $\sin\omega_c t$ and the voltage derived from 1-n+1 to 1-n+m is used to modulate $\cos\omega_c t$. These two modulated carriers are added prior to transmission on a synchronous channel. The combined, modulated carrier is passed through a bandpass filter 106 and the bandwidth of the signal is specified at the 6 dB points. The use of a bandpass filter at the sending side provides spectral separation of the bidirectional transmission on the same channel. The modulated carrier that carries data bits from 1-1 to 1-n and 1-n and 1-n+1 to 1-n+m is delivered in one symbol period.

The DV coder on the receiving side of the channel receives the combined, modulated carrier+channel noise (3-1). This signal is preprocessed in preprocessor 208 to recover some high frequency components that were lost in bandpass filtering at the sending side. The processed signal is then sent to the spike filter (200). The spike filter is used as a noise-reduction device. The spike filter is a 1 KHz bandpass filter centered on the carrier frequency. It is used to process the combined modulated carrier+channel noise in each symbol period to recover the modulated carrier with significant noise reduction. The filtering process is applied to each symbol period separately. The output of the spike filter for each symbol period is sent to multipliers 201 and 202 for recovery of the voltage values of data bits 1-1 to 1-n and 1-n+1 to 1-n+m by low-pass filters 203 and 204. The outputs of the DV coder on the receiving side are DVx and DVy, which are used by the DV decoding trees (206-1 to 206-n) and (206-n+1 to 206-n+m) respectively.

Spike Bandpass Filter

The combined modulated carrier has the following unique characteristics:

In each symbol period, there is only one sinusoidal signal with a phase and an amplitude.

There is very high correlation within a symbol, but there is no correlation between adjacent symbols.

There is correlation of noise within the symbol sample periods but no correlation of noise within the sample period with noise in another sample period.

The first of the above characteristics suggests that the filtering of the received, combined, modulated carrier can be done with a very narrow, spike bandpass filter. This filter eliminates most of the channel noise.

The second of the above characteristics suggests that a conventional digital filter that requires correlation between symbols to generate a stable output requires that the bandwidth of the filter to be the same as that of the channel bandwidth. But, this will not eliminate the channel noise and thus cannot be used for high bandwidth transport.

The third characteristic is used in conjunction with the spike filter to substantially eliminate intrasymbol noise and to greatly enhance the signal to noise ratio at the output of the spike filter.

This invention addresses the above situation by implementing a spike bandpass filter uniquely by processing each symbol independently to recover the sinusoidal signal while eliminating the channel noise.

As this system processes one symbol at a time, only the energy of one pulse is available to distinguish the symbol pulse from the noise energy. The error performance, BER, is a function of the S/N ratio $$S/N = S/N_e B = ST/N_e$$

where T is the symbol period. $N_e$ is the noise intensity and for white noise it is constant throughout the band. Signal repetition of the symbol does not change the S/N. Repetition does, however, allow the symbol to pass through a narrow pass filter. This makes it possible to capture noise which is highly correlated with the noise in the symbol filter in a similar, second narrow band, filter peaked outside the passband of the symbol period. Noise at the output of such a second, narrow band filter is a sine wave and can be subtracted from the signal+noise sinusoidal output of the symbol filter. Then we can write, for a 1 MHZ symbol, for example, $$S_{1MHz} + N_{1MHz} - N_{1.001MHz} = S_{1mhz} + \epsilon$$

where the noise is sampled at 1.001 MHZ outside the symbol filter bandpass. $\epsilon$ may be estimated as N/n where n is the number of signal repetitions or the ratio of channel bandwidth to filter bandwidth.

The spike filter has been implemented in two ways:

Digital Spike Bandpass Filter

Analog Spike Bandpass Filter

Noise Cancelling Spike Bandpass Filter

Figure 7:
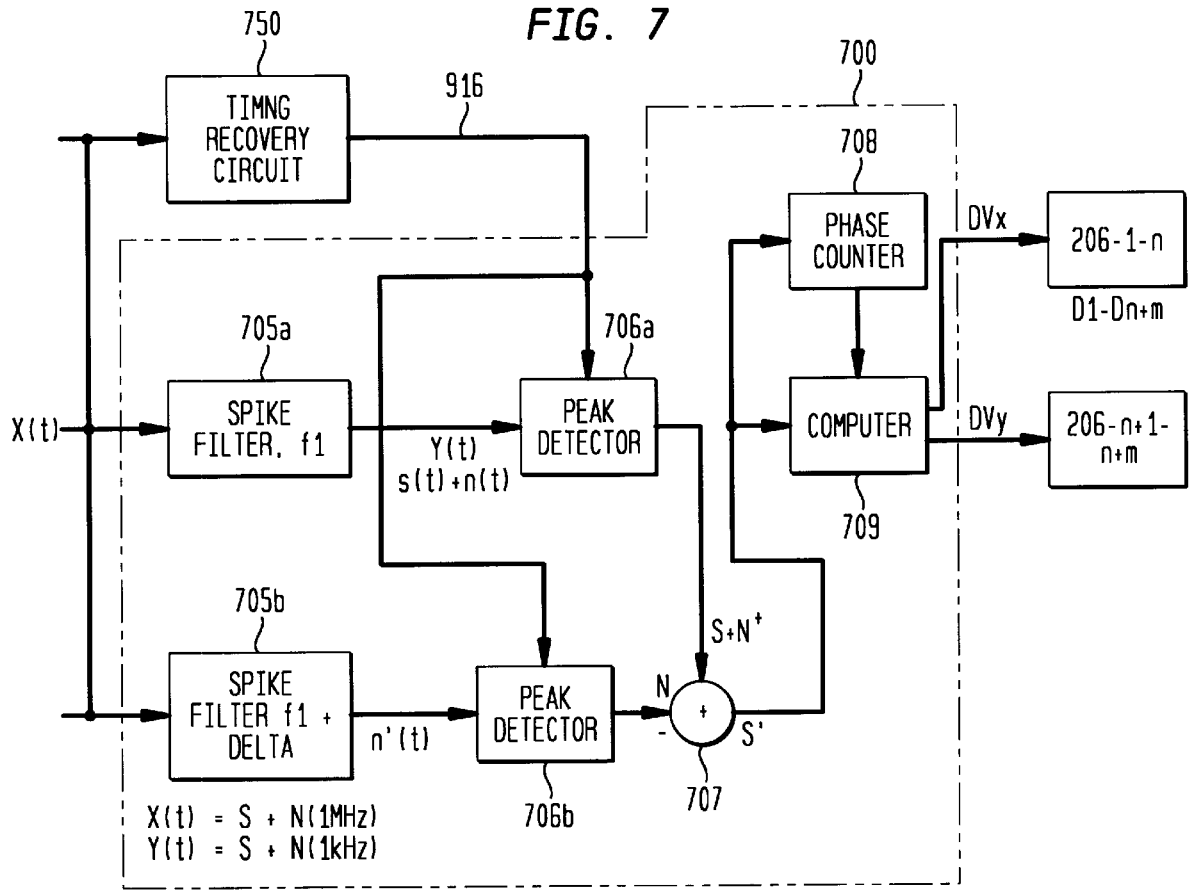

FIG. 7 illustrates a block diagram of the receiving side of the decoder which includes the spike filter 700 comprising a first spike bandpass filter 705a and a second spike bandpass filter 705b. The input to the each spike bandpass filter 705A and 705B is the received modulated carrier, X(t), that has been gated for one symbol period. Thus, for e.g., the symbol period is set to 1 microsecond when the carrier frequency is at 1 MHZ. The received signal from the noise is represented by:

$$X(t) = S(t) + N(t)_{1 \ MHZ \ bandwidth},$$

where S(t) is the modulated carrier and N(t) is the 1 MHZ channel noise.

Figure 8:
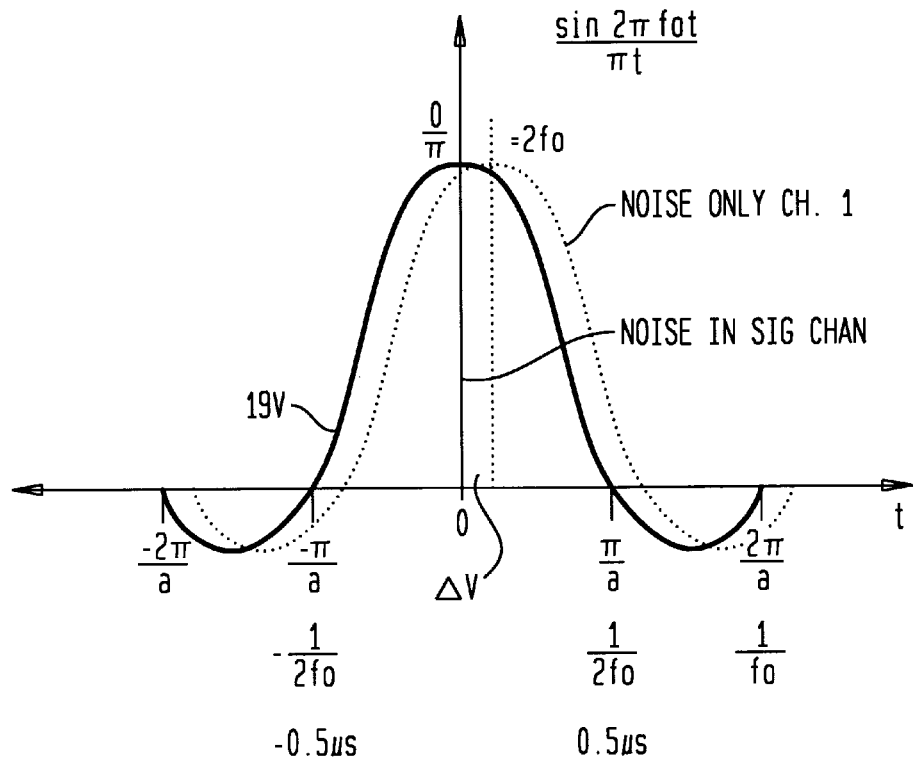
FIG. 8 shows the autocorrelation functions of band limited white noise.
Figure 8:
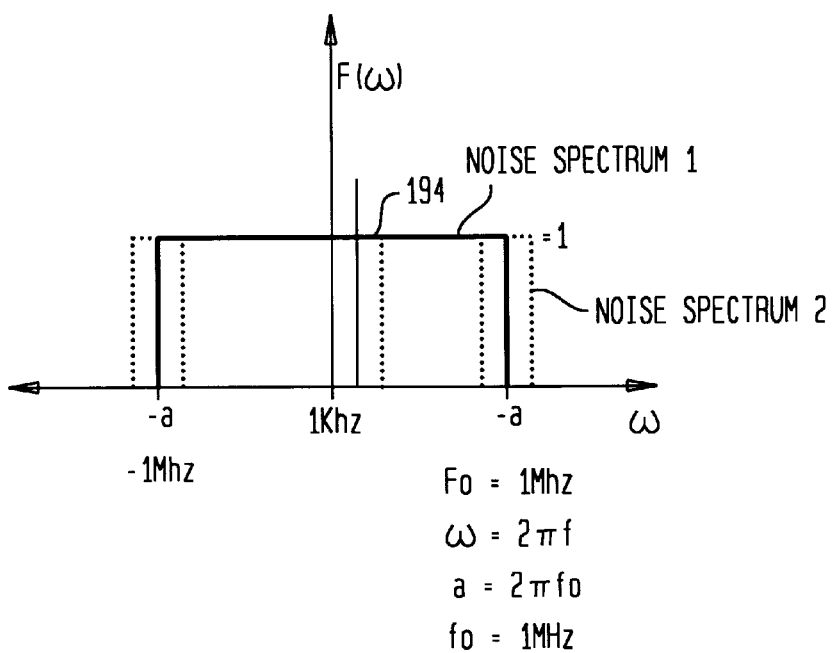

In the embodiment shown in FIG. 7, the spike Filter 705A is tuned to the frequency of the symbol (e.g., 1 MHZ), and Spike Filter 705B tuned to a second frequency (e.g.,1.001 MHZ), given that the spike filter 705A has a bandwidth of less than 1 kHz. (These numbers are examples only to clarify the explanation of function.) The output of filter 705B, which has a band pass equivalent to that of filter 705A, is substantially noise, whereas the output of 705A is symbol signal and correlated noise. It should be understood that the noise in both spike filter outputs is substantially correlated, particularly, in view of the autocorrelation function of band-limited white noise which is the equivalent of Inverse Fourier Transform shown in FIG. 8. As shown in FIG. 8, the Fourier pair is $$\frac{\sin at}{\Pi t} \leftrightarrow P_a(\omega)$$

where the autocorrelation function 192 is the time domain function and the frequency domain function 194 may be considered as noise, having frequencies confined to the band of frequencies of bandwidth "a". It is well known that the function 192 is the autocorrelation of noises of equal amplitudes confined to the band of $P_a(\omega)$ The abscissa "t" of the time domain diagram is, in reality, time differences at which noise of such frequency spectrum characteristic (which exists for an indefinitely long time) is observed. Thus, if the noise time sequences occur at nearly the same time essentially unity correlation exists as shown in FIG. 8, and if two noise signals are displaced in frequency within the same time interval, then they can be subtracted because the correlation between the two noises is close to unity.

In the invention, the noise input to the two spike filters 705A and 705B are substantially simultaneous in time. Only local differential delays in the order of nanoseconds can exist. In contrast, the noise related to different symbols differ by times equal to or greater than the bit widths (microseconds). FIG. 8 also illustrates that the correlation remains nearly unity for much greater time differentials than nanoseconds in the order of a third of a bit width. The sharpness of the filter and/or the number of repetitions, n, determines the available frequency separation.

Thus, as shown in FIG. 7, the noise output of filter 705B will substantially subtract from the signal plus noise output of filter 705A to greatly enhance the S/N ratio. The narrower the bandwidth of the spike filters 705A and 705B, the greater the cancellation. This reduction in noise is significant since it increases the number of voltage levels that can be used and/or reduces the required signal power drastically, which is key to effective bandwidth compression.

Figure 7A:
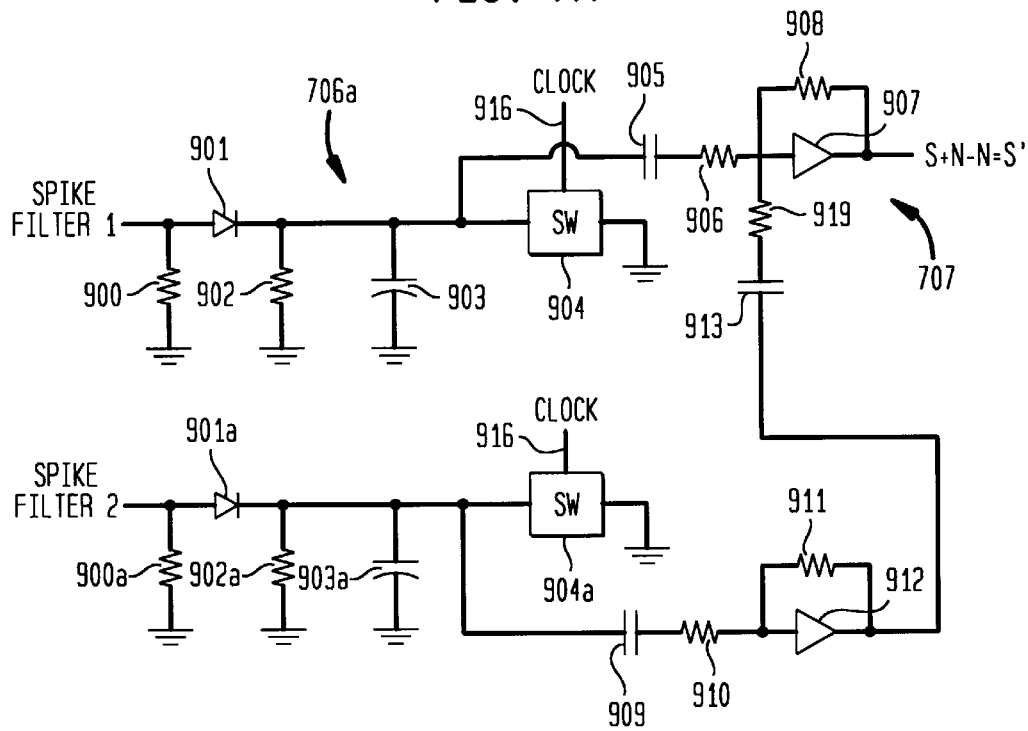

As shown in FIG. 7, the outputs of the spike filters 705A and 705B are simultaneously input to respective peak detectors 706A and 706B. These spike filter outputs are sine waves having one amplitude and phase, the peak values of which are detected in respective peak detectors 706A and 706B. FIG. 7A shows a detailed circuit diagram of a non-limiting, example embodiment of the peak detectors 706A and 706B. The first peak detector 706 a consists of resistor 900, diode 901, resistor 902, and capacitor 903. The values of capacitor 903 and 902 are chosen to maintain the peak value of the detector output closely the same as the signal positive peak for a period equal to one clock interval. The clock signal 916, from timing recovery circuit 750 (FIG. 7) connects the detector output to ground after the signal interval by closing switch 904 for a period equal to the signal (symbol) period. The output of the detector 706A is fed through blocking capacitor 905 to the summing amplifier which consists of amplifier 907, feedback resistor 908 and input resistor 906. These components perform the function of summer 707 shown in FIG. 7. Similarly, peak detector 706B consists of diode 901A, resistor 900A, resistor 902A and capacitor 903A which perform identical functions as for corresponding components described previously for processing the output of the first Spike Filter. The time constant of this circuit is also the same as well as the timing of the switch 904A. The output of this detector feeds an inverting amplifier consisting of capacitor 909, input resistor 910 amplifier 912 and feedback resistor 911. As shown in FIG. 7a, these components provide an output signal which is inverted in phase with respect to the input. This signal is then input to the summing amplifier 907 via capacitor 913 and input resistor 919. In this way peak dc noise signal outputs of the two filters which operate at slightly different frequencies and are similar, will tend to cancel each other, leaving the output to be a dc value corresponding to the peak signal only.

In FIG. 7, there is shown timing recovery circuit 750, which implements, for example, a phase-locked loop receiving as an input the modulated carrier signal and deriving therefrom a clock signal 916 from the transmitter to gate the operation of the peak detector so that it could operate successively on each symbol.

The signal (symbol) received in a specific time interval corresponding to the duration of an uncompressed bit is a sine wave of a specific phase with respect to the clock timing. The peak detector 706A and 706B will provide an output equal in amplitude to the peak value of the sine interval which lasts until cut off by the clock generated by timing recovery circuit 750. The result is that the duration of the pulse output of summing amplifier 707 is a measure of the phase of the symbol signal. Counter 708 measures this duration by starting a counter at the time of positive peak and stopping the counter by the edge of the clock signal. The output phase of counter 708 is a value representing the time corresponding to an angle which value is input to computer 709. Together with the peak amplitude of the pulse output available at amplifier summing amplifier 707, computer 709 709 then determines from a predetermined look up table the phase angle value, $\alpha$, which corresponds to the count value. The computer also determines the corresponding $\sin \alpha$ and $\cos \alpha$ from a stored table and multiplies these values with the amplitude value of the peak detectors to determine the orthogonal components DVy and DVx, respectively. The DVx and DVy values are input to decoding trees (206-1 to 206-n) and (206-n+1 to 206-n+m), respectively, as discussed herein.

The method described herein for deriving the DVx and DVy differs from the method of deriving DVx and DVy as shown in FIG. 3 which utilizes multipliers 201, 202 and low pass filters 203 and 204.

Digital Spike Bandpass Filter

The first and second spike bandpass filters may be digital IIR or FIR filters. Such filters require a processing time of closely 1/Bandwidth. In the example embodiment described, the filter bandwidth is 1 kH so the processing time is 1 ms. In order to keep up with the input symbol rate of 1 MHZ, 1000 filter pairs would be required. This can be avoided by oversampling which speeds up the spike filtering process so that it can be accomplished in one symbol period.

If the samples of the symbols received each microsecond are stored and clocked out repeatedly each 0.01 microsecond, then symbols can be filtered in the 1 microsecond symbol interval. Since the 1 MHZ signal with a 1 kHz bandwidth is scaled up for the spike filter operation, the signals will appear as 100 MHZ signal. Thus, the spike bandpass filter operates at 100 MHZ with a bandwidth of 100 kHz. This method is called oversampling.

Figure 9:
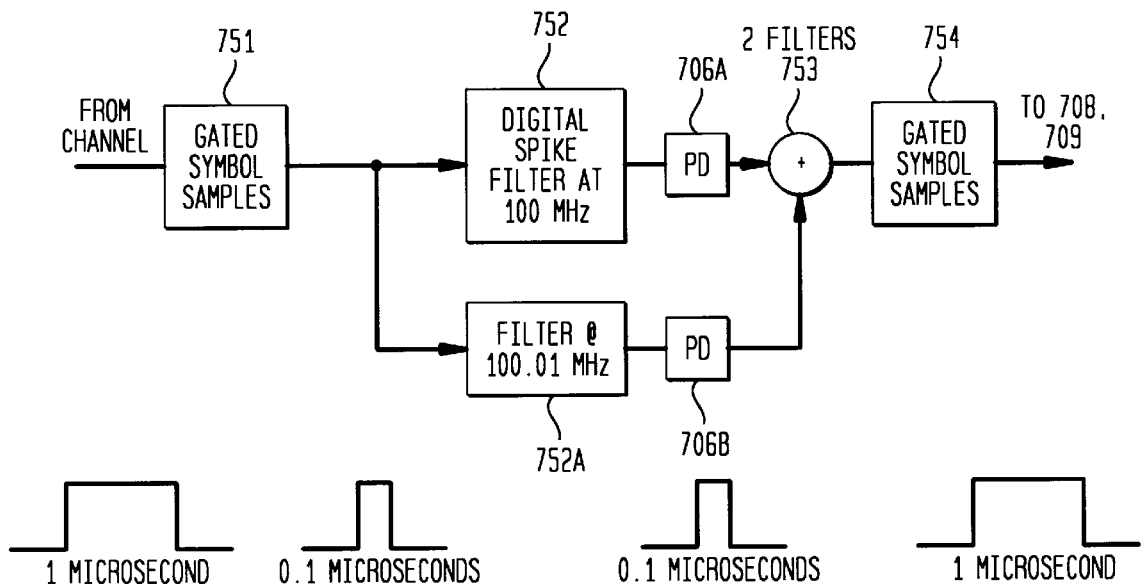
FIG. 9 is a schematic diagram of the use of oversampled digital spike filter.

FIG. 9 shows the operation of the oversampled digital spike bandpass filter. Each symbol (1 MHZ symbol rate) received from the transmission channel is gated and used as the input to the spike bandpass filter. The gated symbol stored in buffer 751 is repeatedly clocked out at 100 MHZ rate. That is, the repeated symbols appear at a oversampled symbol rate of 100 MHZ at the input of the digital spike filters 752 and 752A. The last symbol of the output of the digital filters after a stable symbol recovery are gated out and the last noise symbol of 752A is subtracted from the signal plus noise symbol in summing amplifier 753 and stored in buffer 754. The stable output appears at the end of 1 microsecond. The samples in the symbol are then read out at 1 MHZ rate from buffer 754, which is the symbol rate received from the sending side. This signal is represented as Y(t) as shown in FIG. 7. Y(t) is used as the input to counter 708 and computer 709 to develop DVx and Dvy components. The operation of the spike filters is entirely the same as previously described except that the noise filter 752A must be tuned 1 kHz from the signal filter 752.

Figure 10:
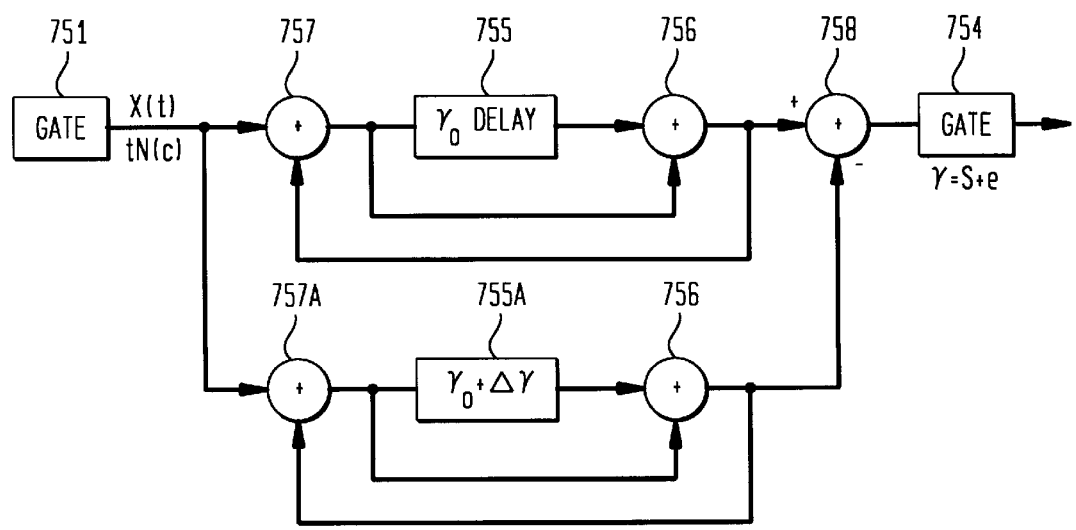
FIG. 10 is a schematic diagram of the use of a recursive type of over-sampled digital spike filter.

A simpler oversampled digital spike filter may be employed than the standard FIR. As shown in FIG. 10, it consists of a single delay unit 755. The output of the delay unit 755 is summed in adder 756 with the input so that the output is:

$$E_n = e_n \sin \omega t + e_{n-1} \sin (\omega t + \omega \tau_o)$$

where $\tau_o$ is the delay of unit 755. This signal is fed back to adder 757 where it adds to the incoming signal e. The successive summation after n iterations results in $E_n = (\sin n\omega\tau_o / \sin \omega\tau_o) e^{j\omega to}$, where $\omega = 2\pi f$. When $f = f_o$, $2\pi f_o \tau_o 2\pi$, the magnitude of $E_n$ will=n, the maximum value, and the nulls will occur at frequencies±$f_o$2n from $f_o$ which defines the bandwidth of the filter. Thus, this system is a narrow pass filter and operates like the filter of FIG. 8. A filter tuned to the null frequency of 755 will provide the noise subtracting signal. This filter is composed of delay 755A and adders 756A and 757A. Subtraction takes place in summation amplifier 758 as shown in FIG. 10.

The required transmission channel band width is determined be the basic uncompressed bit rate. But additional spike filters can operate on the same input channel thereby multiplying the compression factor.

Analog Spike Bandpass Filter

The first and second spike bandpass filters may be analog spike bandpass filters employing a principle of superresonance described in co-pending U.S. patent application Ser. No. 08/518,007 entitled "Compressive Communications and Storage System", filed on Aug. 22, 1995 the contents and disclosure of which are incorporated by reference herein and which is assigned to the same assignee as the present invention.

Figure 11:
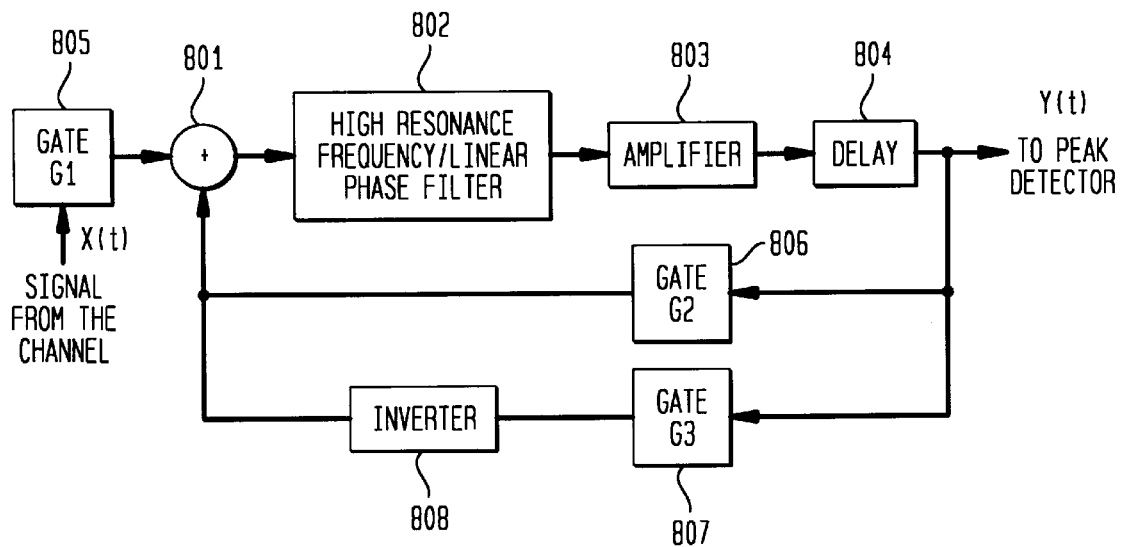
FIG. 11 is a schematic diagram of the gated analog spike bandpass filter.

In the embodiment of the analog filter shown in FIG. 11, the updated combined modulated carrier is gated for one symbol period (e.g., symbol period is set to 1 μs when the carrier frequency is 1 MHZ). In the active mode, when a symbol pulse is being received, gates 805 and 806 pass signals whereas gate 807, stops signals. In the active mode the input symbol pulse is added in summer 801 to fedback signals from the output of amplifier 803 which is fed by signals passing through the Phase/Freq filter 802. There is also an inherent delay 804 primarily in the amplifier which affects loop feedback operation. The characteristics of the filter 802 is given in FIG. 11. The filter characteristic may be obtained from a resonant circuit which has lagging phase shift at frequencies below resonance, zero phase shift at resonant frequency, and leading phase shift above resonance. The phase shift is linear with frequency. The amplifier 803 passes all frequencies, provides a gain around the loop of approximately unity, and consists of a number of stages to insure that the feedback signal is additive at summer 801. (The phase is inverted at each amplifier stage regardless of signal frequency.}

The physical delay 804 around the loop is primarily determined by the amplifier and operation is enhanced by this being minimal. Present day amplifiers have delays measured in nanoseconds per stage. Therefore the signal builds up rapidly in a frequency selective manner, owing to the linear variation of phase with frequency of filter 802 and also because the loop delay is very much shorter than the symbol pulse duration. The frequency selectivity is enhanced by number of rapid recirculations n which occur during the pulse period. The output of the filter is a summation of phasors which results in the expression, assuming the amplitudes are constant, $$E = \Sigma e^{j(\omega t + n\Delta\phi)} = (\sin(n\Delta\phi/2)/\sin(\Delta\phi/2))e^{j\omega t},$$

where Δφ=the phase shift of each phased voltage, of any frequency, per iteration, and $f_o$ is the resonant frequency of the filter (center frequency). This expression for E defines the transfer function of the loop after n iterations. The frequency shift Δf required to cause a phase shift of nΔφ/2=2π after n iterations is Δf=2π$f_o$/2Qn which is derived from the universal resonant curve (see Terman, Radio Engineers' Handbook, page 137, 1st Edition). This is the phase shift of the first null of the loop transfer function and is a reasonable statement of the filter bandwidth. The expression shows that the selectivity is sharpened by the product of Q and n.

Figure 12:
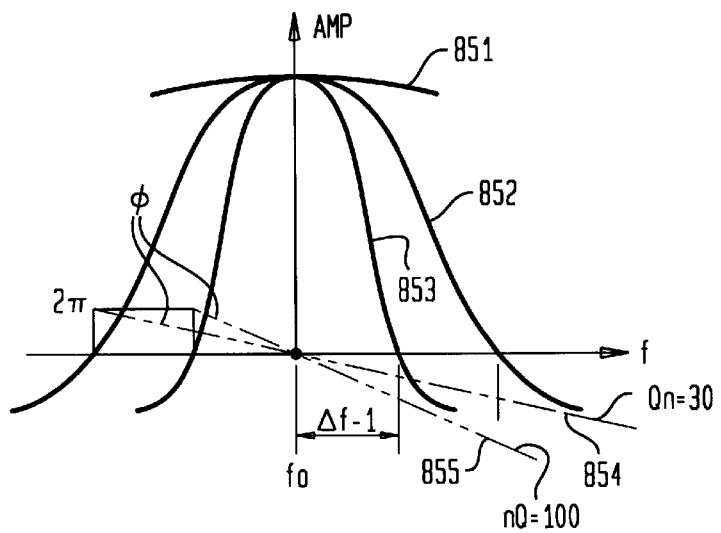
FIG. 12 is the characteristics of the phase frequency filter.

FIG. 12 shows the output characteristic of the filter of FIG. 11 as a function of frequency for two values of Q·n. The repetitious operations occur rapidly so that the FIG. 12 illustrates the final value of a particular pulse. Line 851 shows the spectrum of the input to the filter. The trace indicated as 852 is the final spectrum amplitude given the product of Q and n, where n is the repetitions around the filter and is equal to 30. Trace 854 is the phase variation with respect to frequency for the same Q·n product. Trace 853 shows the final spectrum when Q·n=100 and trace 855 shows the phase/frequency characteristic for the case of Q·n=100 case. FIG. 12 illustrates that superresonance will improve as the factors Q or n increase.

This superresonant filter 802 shown in FIG. 11 can also be used to greatly enhance the signal to noise ratio per symbol pulse. As discussed previously, the signal filter contains noise that is not eliminated by the iterative process. However this noise can be substantially eliminated by the use of a similar filter centered on a close frequency not containing a symbol but within the transmission channel. (See FIG. 7). The output of this second filter is a noise signal highly correlated with noise in the signal filter and will substantially cancel the noise after subtraction. The process is identical with that previously discussed except that the super resonant filter can perform the operation within the signal pulse period without requiring frequency scaling. This suppresses the noise power by a factor n or more and permits a corresponding reduction in the signal power required to discriminate among the transmitted signal levels, effectively improving the practical data compression performance by increasing the amplitude range of levels and by reducing the possible interference with other channels.

It is also useful that the filter achieves its discrimination property with no significant delay. The signal buildup process may be terminated by one of two ways: 1) by reversing the symbol signal input phase, and 2) by inverting the feedback signal immediately after the symbol period. The latter is preferred and will be described. At the end of the active period gates 805 and 806 stop signals and gate 807 passes signal for a period during which no symbol is processed by the spike filter. In this period Gate 807 passes signal to inverter 808 otherwise it does not pass signal. In this way built up symbol signals are erased, but this does involve loss of a symbol interval. The data rate can be maintained by using two spike filters, each operating in alternate intervals.

Symbol Pulse Discrimination

Figure 13:
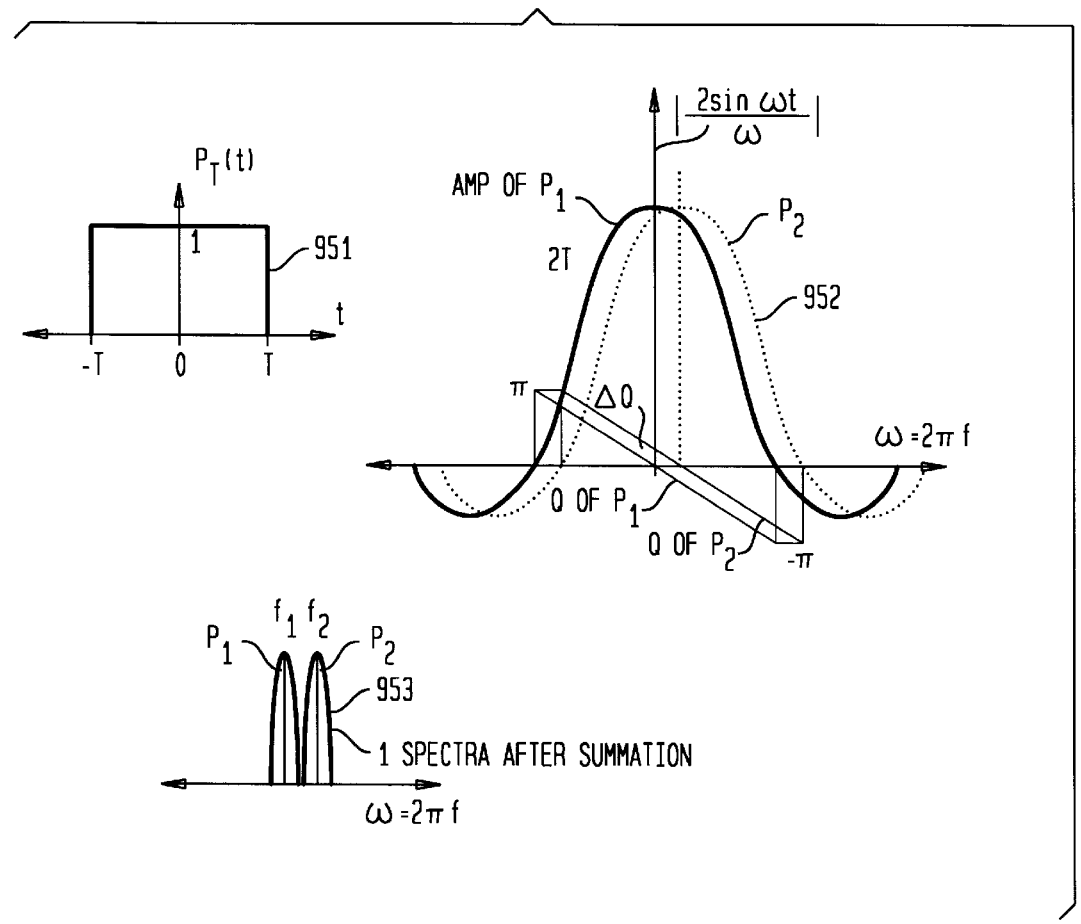
FIG. 13 shows the spectra of overlapping symbol pulses.

FIG. 13 shows how symbol pulses of overlapping spectra are discriminated by the spike filter. Symbol pulses 951 are uniform in amplitude during the symbol time period although they are multiplied by the symbol sine wave. The Fourier Tranform of the pulses 951 is given by $$p_T(t-\tilde{t}) \leftrightarrows (2 \sin \omega T/\omega)e^{-j\omega t},$$

The amplitude of the frequency spectra of the pulses is sin ωt/ω in shape, but as shown in the FIG. 13, the phase angle φ versus frequency ω is linear with frequency between the first nulls and are zero at $\omega_o$, the center frequency of the pulse spectra. This means that pulses of different center frequencies will be discriminated by the phase/frequency filter 802 (FIG. 11), as verified by experiment, which uses the phase differences in the summation process (FIG. 12). In this way additional channels containing symbols of different center frequencies closely spaced one to another will not interfere with one another as shown as the signal 953 which shows the final spectrum of the filter. This enhances the transmission channel capacity, directly as the number of symbol channels that can be so stacked together.

Experimental Results

Experiments were conducted in two parts to demonstrate a proof of concept of the overall system. The first part is to demonstrate the DV coding system using real time simulation on a computer. The second part is the demonstration of the noise cancellation filter (spike filter) in hardware.

Experimental Results for the DV Coding System

The DV coding system, which consists of a DV coder at the sending side, and a DV decoder and DV decoding tree at the receiving side was simulated and tested using a simulated AWG #26 telephone twisted pair (TTP) of a 12,000 feet long. Since representation of a two-way transmission was difficult in computer simulation, one-way simulation was conducted for performance assessment.

The TTP simulation was based on using published values of TTP parameters and scaling values for allowable impedance and power levels in practice in telephone systems. These values were obtained from the professional literature. Impedances were matched according to current telephone practice and all power and voltage levels were scaled similarly.

Figure 14:
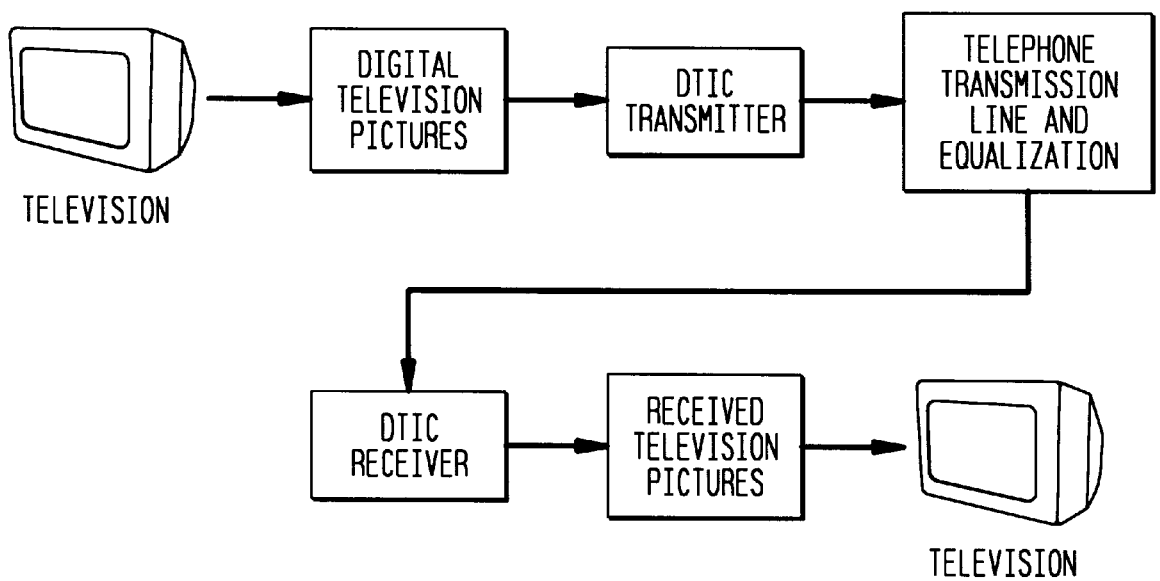
FIG. 14 is a schematic diagram of a demonstration system containing a complete simulation of the DV Coding System over 12,000 feet of 26-gauge TTP.

Data inputs to the system were derived from dual-sequence random number generators and from black and white, and colored images. The demonstration system is shown in FIG. 14. All data and pixel images were recovered at the receiving side accurately. One symbol of 1 MHZ bandwidth was used to send up to 16 bits of user data.

The simulation had a limitation that it tightly coupled the simulation to sampling rate of the symbol carrier. It is extremely important to decouple the sampling rate of the carrier and the sampling rate for the spike filter in order to see the effect of noise reduction of the spike filter, since the simulation could not permit implementation of two spike filters operating at center frequencies very close to each other as was done in the hardware.

This limitation prompted the development of a hardware implemented spike filter for the noise cancellation to demonstrate the proof of concept of the noise cancellation. But the software simulation demonstrated the effectiveness of transmitting up to 16 Mbit/s in 1 MHZ symbol rate.

Experimental Demonstration of Noise Cancellation

Figure 15:
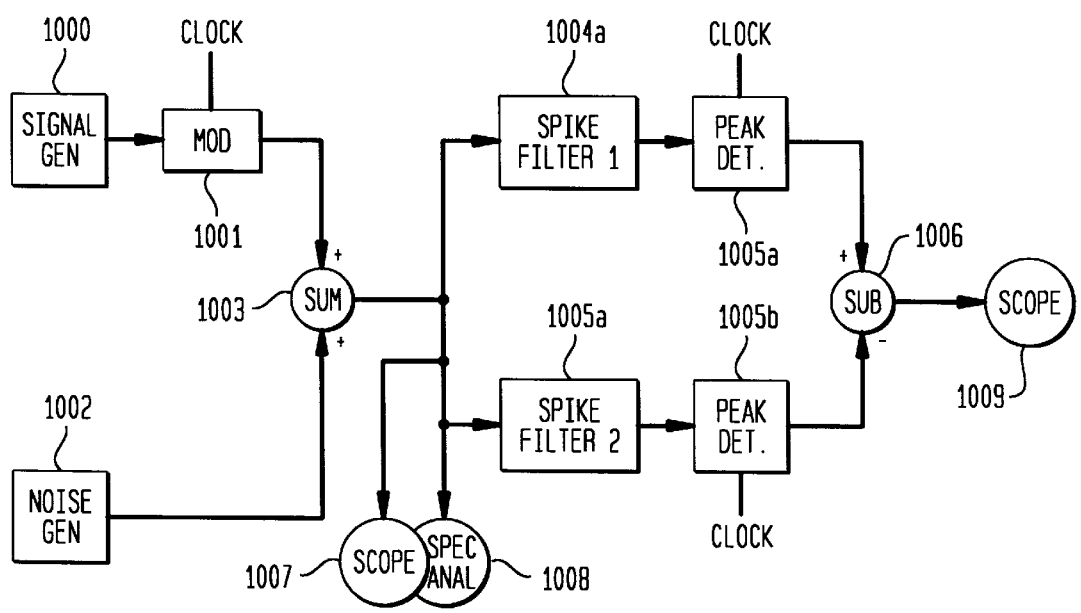
FIG. 15 is a schematic diagram of a demonstration system for verifying noise cancellation receiver.

The noise cancellation technique described above with respect to FIGS. 7 and 7a has been demonstrated by the test circuit shown in FIG. 15 with results being shown in FIGS. 16a–16d. As shown in FIG. 15, sin wave Generator 1000 (Fluke 6060) was used to generate the carrier signal and was modulated by pulsed signals controlled by a digital clock in 1001. The carrier frequency was 26777 KHz and had a magnitude of −20 dbm. A White Noise Generator 1002 (NoiseCom), which generates a band of 30 MHZ of white noise having a maximum power of 13.2 dbm, was used to provide controlled levels of noise. The generated noise signal was summed linearly with the carrier signal in summing amplifier 1003. Oscilloscope 1007 and Spectrum Analyzer 1008 (HP 4270) are connected at the input with the lowest measurable output level as measured by the spectrum analyzer 1008 was −83 dbm when no carrier or noise was present. The equipment under test was as described in FIG. 7, with the modulated carrier signal plus noise being input to a first analog spike filter 1004A and 1005A being its clocked peak detector. The second spike filter 1004B and peak detector 1005B carried noise only and was tuned 3000 Hz from spike filter 1005A. The bandwidths of the filters were approx 30 Hz. The subtractor element 1006 linearly subtracted the noise signal from the first filter. A standard 100 MHZ Oscilloscope 1009 was used to observe the output of the linear subtractor.

Figure 16A:
FIG. 16A–16B shows receiver input and output signal, respectively, in the absence of added channel noise.
Figure 16B:
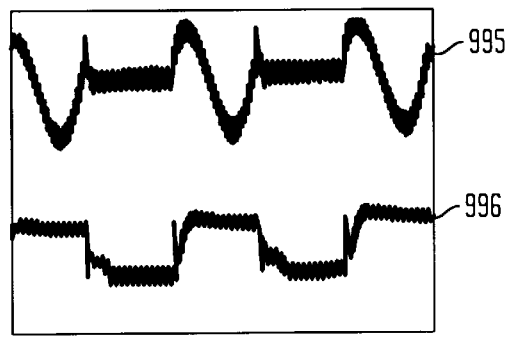

FIG. 16a shows the frequency spectrum taken from spectrum analyzer 1008 of an input modulated carrier signal with no noise. The analyzer 1008 display shown in FIG. 16a shows a −20 dbm signal with a center frequency at 25,667 Hz with two side bands spaced approximately 12.5kHz apart and no added noise. The inherent minimum noise level is −83 dbm. The upper signal 995 shown at the top of FIG. 16b is the time domain input to the receiver with no added noise. The lower signal 996 shown at the bottom of FIG. 16b is the detected output after peak detection and noise cancellation. The input signal illustrated in FIG. 16b was taken from oscilloscope 1007 (FIG. 15) configured with a 10 mv/div y-axis and a 20 msec/div x-axis. The receiver output signal was taken from oscilloscope 1009.

Figure 16C:
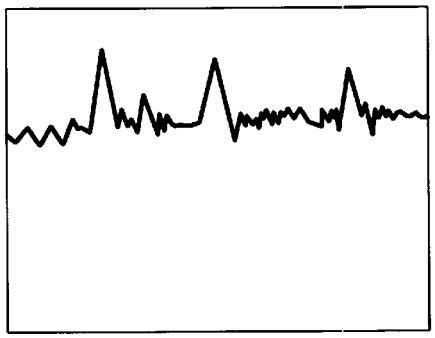
FIG. 16C–16D shows receiver input and output signal, respectively, with an added 30 dB noise power increase.
Figure 16D:
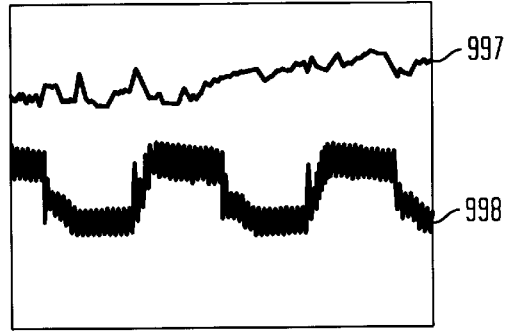

FIG. 16c shows the frequency spectrum of the input modulated carrier with 30 db of added noise. As can be seen, the power of the noise is greater than the power of the modulated carrier. The input S/N ratio was approximately −3 db. The output signal after noise cancellation in subtractor 1006 and measured by oscilloscope 1009 is shown in FIG. 16d. As can be seen, the receiver output signal 998 shown at the bottom of FIG. 16d was minutely disturbed even though the input signal 999 shown at the top of FIG. 16d contained 30 db of added noise.

The method described here makes possible the reception of several signals requiring a channel bandwidth determined by information bit rate, i.e., the symbol rate or the time rate at which information is sampled as shown in FIG. 16b. However, the signal demodulator occupies a very narrow bandwidth as well as the sidebands so that several such signals, offset by frequencies differing by a fraction of the channel bandwidth may occupy the same bandwidth (as described in above-mentioned co-pending U.S. patent application Ser. No. 08/518,007). In effect, this further increases the bandwidth compression of the system by enhancing the throughput of the bandlimited transmission highway.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. A transmission system for improved bandwidth compression comprising:

means at a first location for simultaneously encoding a first group of parallel binary bits into a voltage amplitude signal occurring in a predetermined symbol period, means for modulating a carrier with said voltage amplitude signal, means for transmitting said modulated carrier to a second location over a bandwidth limited communications path having intrinsic noise therein, means at said second location for demodulating said modulated carrier to recover said voltage amplitude signal, said demodulating means including noise cancellation means for substantially canceling said intrinsic noise and improving the signal to noise ratio of the recovered voltage amplitude signal; and means at said second location for decoding said recovered voltage amplitude signal into a second group of parallel binary bits which correspond to said first group of parallel binary bits encoded at said first location, wherein said demodulating means includes a spike filter means of substantially less bandwidth than the bandwidth of said bandwidth limited communications path for receiving said modulated carrier signals and operating on each successive voltage amplitude signal to reduce noise and cross-talk received at said second location.

2. A transmission system in accordance with claim 1, wherein there is further included means for accepting a stream of binary bits in serial form and converting said stream of serial binary bits into said first group of parallel binary bits for presentation to said encoding means.

3. A transmission system in accordance with claim 1, wherein at least two groups of parallel binary bits are simultaneously independently encoded by said encoding means at said first location, one of said encoded binary bit groups modulating a first carrier, and a second of said encoded binary bit groups modulating a second carrier which is phase-shifted 90° from said first carrier, said system further including:

means for combining said first and second modulated carriers to produce an added carrier signal, means for transmitting said added carrier signal to said second location over said bandwidth-limited communications path, means at said second location for demodulating said added carrier signal by a first generated carrier signal of the same relative phase as said first carrier used at said first location, and demodulating said added carrier signal with a second generated carrier out of phase by said 90° with said first carrier used at said first location, whereby two or more digitized voltage amplitude signals are created, and means for decoding said two or more digitized voltage amplitude signals separately into at least two separate groups of parallel binary bits, each of said decoded separate groups corresponding to said groups of parallel binary bits encoded at said first location.

4. A transmission system in accordance with claim 3, wherein said encoding means assigns specific positive or negative voltage values to each of said groups of parallel binary bits, said voltage value for each bit including a predetermined offset voltage value determined by an available communications path voltage range whereby any sum of encoded binary bits will be uniquely distinguishable from any other sum of encoded binary bits.

5. A transmission system in accordance with claim 3, wherein said decoding means includes a logical decision tree which estimates a "1" or a "0" binary value for each bit position of said group of parallel binary bits.

6. A transmission system in accordance with claim 3, wherein said spike filter means includes a first spike filter of a first bandwidth and tuned to a frequency of said carrier signal, and a second spike filter tuned to the carrier frequency signal plus a frequency differential exceeding the frequency bandwidth of said first spike filter, whereby an output signal of said first spike filter includes the modulated carrier signal plus noise and an output signal of said second spike filter includes noise substantially correlated with said noise output from said first spike filter.

7. A transmission system in accordance with claim 6, wherein each said first and second spike filter is a super-resonant filter.

8. A transmission system in accordance with claim 6, wherein said first and second spike filters are repetitive filters operate independently on a number of gate selected successive voltage-encoded pulses received in predetermined and successive symbol periods, each of said voltage encoded pulses being repeated in each said first and second spike filters a predetermined number of times to produce first and second output signals have substantially correlated noise.

9. A transmission system in accordance with claim 8, wherein said noise cancellation means further includes means for subtracting said output signal of said second spike filter from said output of said first spike filter to cancel said correlated noise from said demodulated carrier.

10. A transmission system in accordance with claim 9, further including first peak detector means for obtaining a first peak signal value of said output signal from said first spike filter and second peak detector means for obtaining a second peak signal value of said output signal from said second spike filter, said subtracting means subtracting said second peak value signal from said first peak value signal to cancel said noise component from said demodulated carrier.

11. A transmission system in accordance with claim 10, further including means for simultaneously controlling a timing operation of said first peak detector means and a timing operation of said second peak detector means to effect respective first and second peak detector operation at each successive symbol time interval.

12. A transmission system in accordance with claim 11, further including means for determining amplitude and phase of said demodulated carrier signal in each successive symbol period and computing orthogonal components for each successive digitized voltage amplitude signal.

13. A transmission system in accordance with claim 12, wherein said means for determining amplitude and phase of said demodulated carrier signal in each successive period further includes means for measuring the time difference between a detected output of said first peak detector means and an end of its corresponding symbol time interval.

14. A transmission system according to claim 1, wherein said communications path is a telephone twisted pair (TTP) which has been conditioned to carry wide band signals, and other forms of transmission media used in telephone systems.

15. A transmission system according to claim 1, wherein said communications path is a channel within a television cable.

16. A transmission system according to claim 1, wherein said communications path is a satellite television distribution or broadcast channel.

17. A transmission system according to claim 1, wherein said communications path is a cellular telephone, mobile communications or personal communications services (PLS) channel, whether terrestrial or satellite.

18. A transmission system in accordance with claim 1, wherein two or more systems are frequency interleaved so that they may occupy said bandlimited communications path with substantially no interference.

19. A full duplex transmission system for improved bandwidth compression comprising, means at a first location for simultaneously encoding a first group of parallel binary bits into a voltage amplitude signal occurring in a predetermined symbol period, means for summing said voltage amplitude signal at said first location with received and a first demodulated information signal received at said first location from a second location, means at said first location for modulating a carrier with an output signal from said summing means, means at said first location to subtract said voltage amplitude generated at said first location from said first demodulated information signal received at said first location to recover said information signal originated from said second location, means at said second location for simultaneously encoding a second group of parallel binary bits into a voltage amplitude signal occurring in a predetermined symbol period;

means for generating said first demodulated information signal at said second location for transmission to said first location over a bandwidth limited communications path;

means at said second location for summing a second demodulated information signal received at said second location with said information signal generated at said second location, means at said second location for modulating a carrier with an output signal from said summing means, and means at said second location to subtract said first demodulated information signal originating at said second location from said demodulated information signal received at said second location to recover said information signal originated from said first location.

20. A transmission system in accordance with claim 19, wherein said first carrier at said second location is transmitted to said first location over said communication path and acts as said first carrier at said first location.

* * * * *